(12) United States Patent
Avvanzo et al.

(10) Patent No.: US 12,143,137 B1
(45) Date of Patent: Nov. 12, 2024

(54) MULTIFUNCTIONAL EQUIPMENT FOR THE CONTROL AND MANAGEMENT OF PLANTS AND SPECIAL AREAS

(71) Applicants: Pierluigi Avvanzo, Foggia (IT); Stefano Frasca, Foggia (IT); Claudio Sperindio, Manama (BH)

(72) Inventors: Pierluigi Avvanzo, Foggia (IT); Stefano Frasca, Foggia (IT); Claudio Sperindio, Manama (BH)

(*) Notice: Subject to any disclaimer, the term of this patent is extended or adjusted under 35 U.S.C. 154(b) by 409 days.

(21) Appl. No.: 17/497,904

(22) Filed: Oct. 9, 2021

(51) Int. Cl.
| | |
|---|---|
| *H04B 1/38* | (2015.01) |
| *H01Q 1/27* | (2006.01) |
| *H04B 1/3827* | (2015.01) |
| *H04L 9/32* | (2006.01) |
| *H04L 67/12* | (2022.01) |
| *H04L 9/00* | (2022.01) |

(52) U.S. Cl.
CPC .............. *H04B 1/3827* (2013.01); *H01Q 1/27* (2013.01); *H04L 9/3239* (2013.01); *H04L 67/12* (2013.01); *H04L 9/50* (2022.05)

(58) Field of Classification Search
CPC ...... H04B 1/3827; H01Q 1/27; H04L 9/3239; H04L 67/12; H04L 9/50
USPC ....................................................... 455/552.1
See application file for complete search history.

(56) References Cited

U.S. PATENT DOCUMENTS

| | | | |
|---|---|---|---|
| 2009/0204458 A1* | 8/2009 | Wiese ................... G06Q 10/06 717/101 |
| 2016/0249483 A1* | 8/2016 | Lv ......................... H05K 7/1468 |
| 2017/0013810 A1* | 1/2017 | Grabell ................. A01K 61/80 |
| 2020/0225655 A1* | 7/2020 | Cella ............... G05B 19/41875 |
| 2020/0348662 A1* | 11/2020 | Cella ............... G05B 19/41865 |
| 2021/0156036 A1* | 5/2021 | Klink ....................... C25B 9/73 |
| 2021/0157312 A1* | 5/2021 | Cella ................... G01M 13/045 |
| 2022/0004672 A1* | 1/2022 | Santarone ............. G06T 19/006 |
| 2022/0108262 A1* | 4/2022 | Cella .............. G06Q 10/063118 |
| 2023/0389178 A1* | 11/2023 | Rooyakkers .......... H04L 63/062 |

FOREIGN PATENT DOCUMENTS

| | | |
|---|---|---|
| EP | 1818113 A1 | 8/2007 |
| IT | FG20120007 A1 | 10/2012 |
| WO | 2015/004691 A1 | 1/2015 |
| WO | 2018222597 A2 | 12/2018 |

OTHER PUBLICATIONS

Lu Hongfang et al., Blockchain Technology in the Oil and Gas Industry: A Review of Applications, Opportunities, Challenges, and Risks, IEEE Access, Apr. 11, 2019, pp. 41426-41444, vol. 7.

* cited by examiner

*Primary Examiner* — April G Gonzales
(74) *Attorney, Agent, or Firm* — Ferguson Case Orr Paterson

(57) ABSTRACT

Provided is a multifunction man-size apparatus or ground station for the control and management, in real time, of complex plants and/or special areas in which it is installed for monitoring, which is inter-connected in a distributed network with other multifunction apparatuses or ground stations providing a decentralized and almost completely unmanned control over productive or operational assets, equipment and data.

20 Claims, 18 Drawing Sheets

MULTIFUNCTIONAL EQUIPMENT FOR THE CONTROL AND MANAGEMENT OF PLANTS AND SPECIAL AREAS

FIELD

The present application relates to a modular apparatus which combines different features and functionalities for the management and control of Assets, equipment and data in a new decentralized and unmanned way.

BACKGROUND

Production assets, equipment and data are usually monitored and controlled by different and sometimes incompatible softwares and hardwares whose outcomes often rely on human intervention even in remote, dangerous or uncomfortable productive or operational areas. The need for a simpler, leaner and more efficient solution is felt in different industries and production processes. The present application relates to an unmanned distributed network solution made of ground stations which provides different resources and features by combining different digital and physical technologies.

SUMMARY

This is a multifunction apparatus or ground station 100 for the control and management, in real time, of complex systems and/or special areas in which it is installed which is inter-connected in a distributed network with other multifunction apparatuses or ground stations 100 comprising a plurality of electrical and electronic devices contained in a plurality of modules 101,102,103 which can be assembled together. Said multifunction apparatus 100 comprises a monitoring and telecommunication module 101, a security, automation and digital recording module 102 103 and an electrical power supply and connection. These modules can be assembled in plug & play mode, minimum footprint on the ground, total start-up of services in a few minutes, without the need for instrumental calibration and easy transport even on vertical take-off aircraft. The data collected by the plurality of these devices is recorded in a two-layer, inviolable Blockchain.

BRIEF DESCRIPTION OF THE DRAWINGS

In the following portion of the description, the teachings of the present application will be explained in more detail with reference to the example embodiments shown in the drawings.

DETAILED DESCRIPTION OF THE INVENTION

Figure 1:
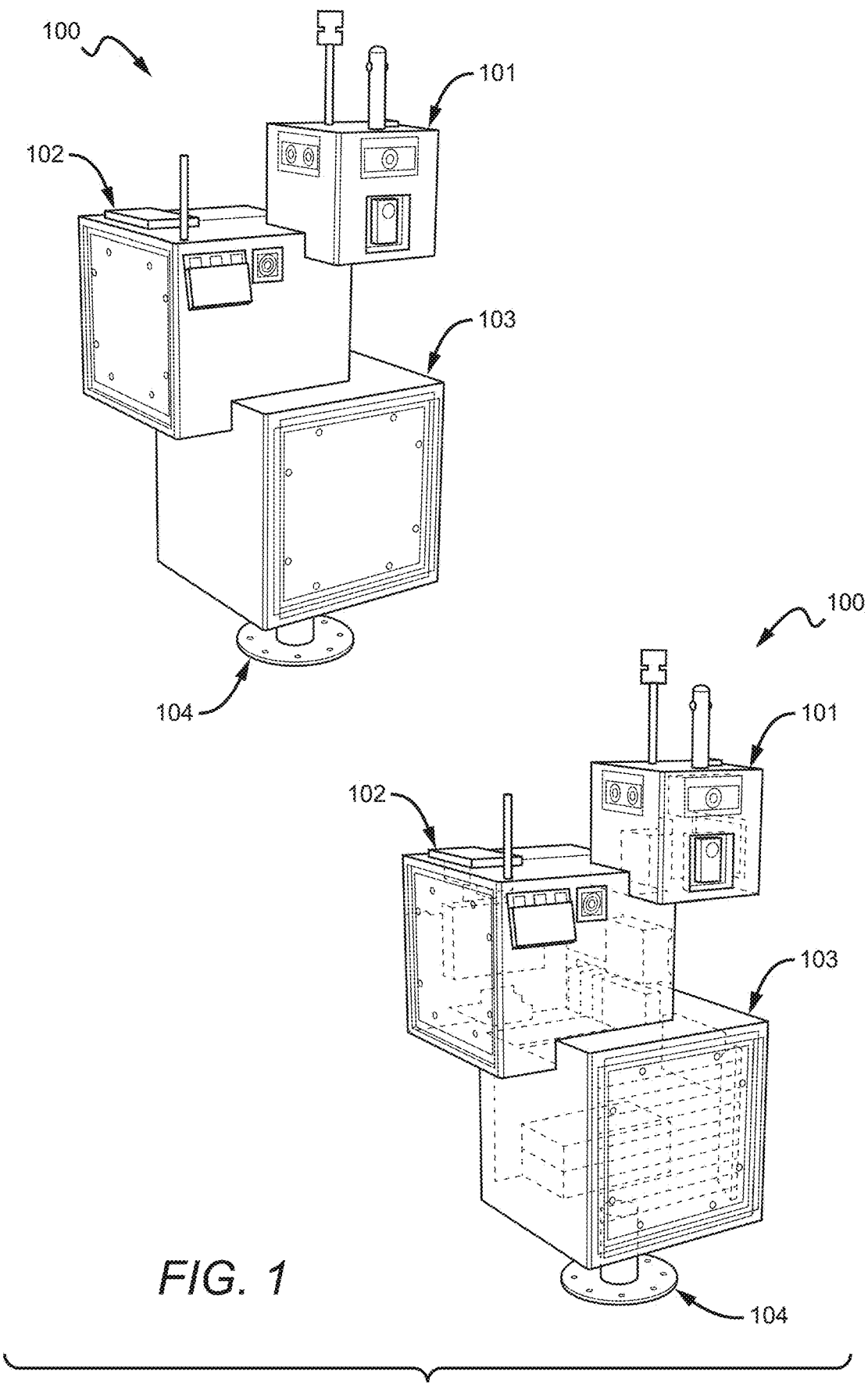
FIGS. 1, 1a, 1b, 1c, represent a scaled isometric view of the multifunction apparatus as for a first embodiment.

The present invention relates to an innovative multi-function apparatus which can be quickly installed because it is completely Plug & Play for the control and management of "complex plants" and/or "special areas".

More precisely, the subject of the present invention is a multi-function apparatus suitable for the safe and certified detection and storage of data and parameters representative of said complex plants and/or special areas as well as arranged for their protection and inviolability.

A further object of the present invention is an innovative multi-function apparatus adapted to implement a plurality of functions for the control and management, in real time, of said complex plants and/or special areas.

The invention therefore fits into the field of control, management and safety of special and complex plants and/or "sensitive areas", such as, without any limitative intent, Oil & Gas plants, chemical plants, industrial plants, dangerous environments (eg. explosion risk and/or characterized by chemical risk), reserves and natural parks, aeronautical and avionic structures (e.g., for the management of helipads or take-off and landing runways, offshore and/or ditching areas) and/or ports, military bases, hospitals or similar.

Furthermore, nothing prevents the invention from extending to fields other than those listed above, for example for the detection and management of fires in wooded areas or buildings, for anti-poaching operations and monitoring of illegal wildlife trafficking, for the management emergencies (floods, earthquakes, eruptions, landslides, fires, pollution), in the field of water resources management (e.g., aqueducts and water plants), etc.

From here on, for the sake of simplicity, it is specified that said "plants and/or special areas" may also be indicated with the more general term of "sites".

The invention is intended to be extended, at least for some of its forms and executive variants, also to any means (for example, aircrafts, land and naval vehicles, etc.) which are capable of interacting and/or operating in said plants and special areas.

Multi-function devices for control and management, remotely and in real time, of "plants and/or special areas" (or sites) have been known for some time.

More precisely, it is already common to install one or more multi-function devices at said sites that allow:

the detection of data and functional parameters, which can be used by interested parties, and the monitoring of one or more areas, infrastructures or equipment in order to ensure its safety and operation as well as to verify the accesses of personnel and/or visitors and their movements and behavior.

Normally, said multi-function apparatuses consist of monobloc structures comprising inside them, suitably located and installed, the various electronic and electrical devices and components necessary to satisfy and ensure some of the aforementioned functions. This involves various problems both of a technical-constructive and functional nature.

For example, the monobloc structure, of not negligible dimensions and weights, makes it difficult to transport the multi-function apparatus from the production plant to the installation one; its transport may in fact require unconventional vehicles or equipment while multiple operators with highly specialized skills can be employed for the installation. This negatively affects the final costs of the multi-function apparatus.

Sometimes, as seen, these multi-function devices are installed in "dangerous" sites, e.g. with high chemical and/or explosion risk.

In such environments, working "in situ" to solve any technical problems of the monobloc multifunction apparatus could be very risky for the health and safety of the technical assistance staff.

In fact, their possible interventions could act as a trigger for dangerous situations such as, for example, explosions or fires, while the movement and transport of the entire multifunction apparatus to be maintained towards the repair laboratories appears complicated and inexpensive.

The replacement or repair of even a single defective component may also require the temporary suspension of all the other functions of the multifunction apparatus, which will therefore no longer be able to guarantee adequate management of the monitored site.

It is also known that current multifunction apparatuses cannot ensure the security of the acquired data and parameters, exposing them to the risk of tampering and manipulation (for example, to conceal or falsify anomalous data or to take possession of sensitive information, etc.).

Finally, none of the known multifunctional devices for the control and management of "plants and/or special areas" is suitably designed to withstand vandal and criminal acts or sabotage, with negative consequences for the safety of the entire monitored site or its infrastructures.

The purpose of the present invention is to eliminate the problems described above by designing an innovative multifunction apparatus for real-time control and management of complex plants and/or sensitive areas.

More precisely, the purpose of the present invention is to provide a multi-function control and management apparatus for "special systems and/or areas" that is easy to transport, easily installed and rapidly implemented with other functions, without the need for specific technical skills. by the installer or user.

A further object of the present invention is to provide a multi-function apparatus for the control and management of "special plants and/or areas" that can be installed in any site and environment and protected from vandalism and sabotage.

A further purpose of the present invention, among the main ones, is to provide a multi-function control and management apparatus of "special systems and/or areas" and of any vehicles and aircraft interacting with them to ensure the security of data and parameters acquired and stored, eliminating the risk of tampering and illegitimate manipulations.

These and other purposes, which will become clear later, are achieved with a multi-function apparatus for the control and management of "special plants and/or areas" as described and claimed herein.

Other purposes can also be achieved by means of the additional characteristics of dependent claims.

The characteristics of the invention are now described, using the references contained in the figures. First of all, it should be noted that in the course of this discussion, reference will mainly be made, when necessary, to a multifunctional control and management apparatus of plants in the Oil & Gas sector and their related infrastructures and/or avionics/aeronautical structures and any means (e.g. aircraft) interacting with them.

Of course, nothing forbids that everything that will be said with reference to Oil & Gas plants and/or the aeronautical sector can also be extended to any other type of complex plants and/or areas, for example to any plant or industrial plant, for the monitoring of environments "sensitive" (e.g. at risk of explosion or chemical, subject to terrorist attacks, at risk of pollution, etc.), of reserves and natural parks, of hospitals or ports (offshore and ditching areas), in the avionics field (e.g., for the management of helipads and runways), governmental and/or military bases, and/or aqueducts and water stations or similar.

It is clear that depending on the reference field, the multifunction apparatus of the invention will require adaptations and additions within the reach of a person skilled in the art, consisting, for example, in the addition or replacement of some electrical or electronic devices or in the type of data and parameters to be acquired and processed.

With reference to FIGS. 1, 1*a* and 2, 100 shows the multifunction apparatus of the invention for the control and management, in real time and locally and/or remotely, of "systems and/or special areas", also these "sites", and any vehicles and aircraft interacting with them. Said multifunction apparatus 100, preferably created to be installed and used in any site (even dangerous or disadvantaged), even geographically distant from the relative supervisor, comprises a plurality of electrical and electronic devices, each in charge of a specific function.

Said devices are organized in "groups of devices" according to their specific functionality, suitably customized and incorporated in one or more modules 101,102,103, preferably cubical and of reduced dimensions; when assembled, said modules define the external structure (or body) of the multifunction apparatus 100. From here on, the cubical modules will be understood as modules with any polyhedral geometry, preferably cubic or parallelepiped.

Without any limiting intent, the multifunction apparatus 100 can include three different cubical modules 101,102, 103, interconnected (FIGS. 1 and 2) and assembled so as to have in common the same computerized local network, (or, for example, a network serial bus) and, preferably, the same energy source and relative power supply network.

The multifunction apparatus 100 once connected to said electrical network and relative computerized local network, is operational without any further calibration and/or human intervention (for example by the operators assigned to the installation).

Figure 1A:
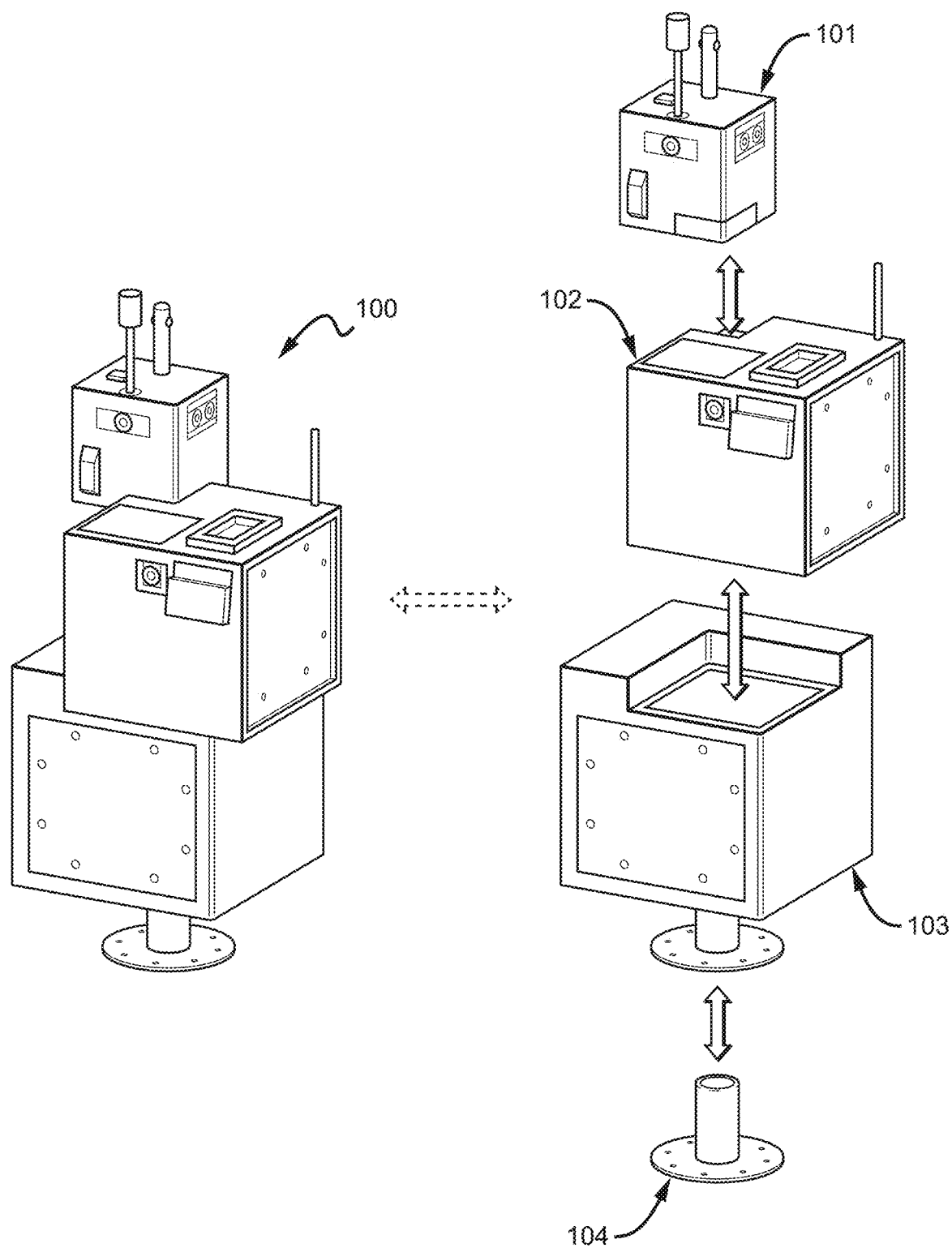

Preferably, the modules 101,102,103 are stacked on top of each other so as to define a sort of vertically developed "totem" (FIGS. 1, 1*a*)

According to the invention, said modules 101,102,103 integrate a Plug & Play technology for their mutual assembly/disassembly while the various devices associated with them can already be suitably pre-assembled, configured and made operational by the manufacturer.

It is immediately evident that, compared to a monocoque, the modules 101,102,103 are more easily transportable and quick to be assembled (and disassembled), even by non-expert personnel.

By "Plug & Play" is meant the arrangement, on each cubital module 101,102,103, of both compulsory and complementary grafts for their mutual assembly (see, for example, the geometric couplings between each module 101,102,103 schematically represented in FIG. 1a) and of special and special connectors and couplings 137 electrical and electronic for the connections between the wiring of the devices integrated therein.

It should be noted that the aforementioned assembly couplings and the connectors and attachments 137 (or other similar means of assembly and electrical and electronic connection) of the modules 101,102,103 they are not explicitly shown in the attached figures, as they conform to those of the state of the art and are well known to a person skilled in the art.

For example, without any limitative intent, said quick couplings can comprise mechanical, preferably equipped with anti-release safety catch, while the electrical connectors for the wiring of the modules 101,102,103 can be also of the type compliant with the ATEX (Atmospheres and Explosive) IEC600079 directives.

These quick couplings and Plug & Play connectors also facilitate the possible replacement of one or more of the modules 101,102,103, in case of breakdowns or maintenance of their internal devices.

For this purpose, "clone" modules can be provided, also "Plug & Play" and therefore quickly replaceable even by inexperienced workers.

By "clone" module we mean more precisely a module substantially identical to one of those already installed in the multifunction apparatus 100, or of the type equipped with the same mechanical locks and electrical connectors, including the same devices which are also already preconfigured and operational as well as characterized from similar components and communication addresses (for example, on TCP/IP network, RS485 serial bus line and the like).

This makes the multifunction apparatus 100 of the invention rapidly restorable after any failure or malfunction as well as immediately operative as soon as the replacement of one or more modules 101,102,103 has been completed. This ensures total safety for maintenance personnel and compliance with the so-called "SLA times" (Service Level Agreement), or the satisfaction of contractual obligations, in terms of metrics and quality of service, agreed between the supplier of the multifunction apparatus 100 and customer/end user.

In other words, the multifunction apparatus 100 of the invention allows, upon the occurrence of a possible technical problem in one of its modules 101,102,103:
the immediate restoration of the corrupted module (101, 102 or 103) with a "clone"; and
avoiding the on-site opening of the faulty module 101, 102,103, eliminating the risk that its malfunctioning devices accidentally generate emergency situations (explosions, fires, etc.).

The easy transportability of the modules 101,102,103 also facilitates their removal for repairs away from the installation site of the multifunction apparatus 100, avoiding the sending of technical assistance on site; this is particularly advantageous in the case of disadvantaged and isolated sites, such as off-shore oil platforms, in deserts, islands, etc.

According to a possible embodiment of the invention, the modules 101,102,103 of the multifunction apparatus 100 can be internally pressurized (by means of known techniques); this pressurization creates a sufficient overpressure inside each module 101,102,103 to prevent infiltration of humidity and entry from the outside of vapors, gases or any other "harmful" substance for the electrical wiring and the functionality of the various devices housed therein.

For sites not subject to fire or explosion hazards, the multifunction apparatus 100 is always hermetically isolated from the external environment (thanks, for example, to special seals in the parts in direct communication with the outside, such as the cable passage sections. and connectors 137 and/or assembly and mechanical fixing of the modules themselves). Even if the multifunction apparatus 100 does not exchange air directly with the outside for internal aeration, an apparatus 149 is used to cool and protect the electronic components inside the modules 101,102,103 (for example from salt, dust, etc.) thermoelectric cooling (TEC) which uses the Peltier effect which creates a thermal flow between the junction of two different types of materials (FIG. 2a).

The multifunction apparatus 100 of the invention also comprises at least one support base 104 which distances it from the ground and consisting of a tubular element of suitable height, bound to one of the modules 101,102,103 (preferably to the lower one 103).

This support base 104 can also be of adjustable height, for example of the telescopic type, so as to vary, if necessary, the distance from the ground of the modules 101, 102, 103.

The main electrical and electronic devices of the multifunction apparatus 100, both internal and external to its modules 101,102,103, are now described.

It is reiterated that, for the sake of simplicity, reference will be made to a multifunction apparatus 100 comprising three modules 101,102,103 although nothing prevents some of the components housed therein, or others that may be implemented, from occupying further additional modules.

According to the variant illustrated in FIGS. 1 and/or 2, therefore we see:
a module 101 for monitoring and telecommunication,
a module 102 for security/safety, automation and digital recording,
a module 103 for electrical power supply and connections, the name of each module substantially depends on the characteristics techniques of the main devices they house and the functions that can be carried out.
More precisely:
the module 101 for monitoring and telecommunication, can include devices and components capable of at least:
detecting data representative of specific "environmental" conditions of the site where the multifunction apparatus 100 is installed, such as atmospheric and meteorological data, and/or
identifying and enabling the operational staff (internal or external) present in the monitored site, and/or
monitoring activities and operations carried out in the vicinity of the multifunction apparatus 100, preventing vandalism, sabotage or similar behavior, and/or
providing authorized personnel with means of telecommunication to other multifunction apparatuses 100 located in the same site of interest (or in others) as well as to any "remote" surveillance and management centers and/or to vehicles and operating vehicles in motion or approaching the monitored site; the module 102 for security/safety, automation and digital recording can:

acquire and store (and possibly also process) operational and functional data of the monitored site (also generically called "telemetry data"), such as parameters and functional data of machines and equipment, automations or systems present in it (hereinafter also referred to as infrastructures) as well as any vehicles and aircraft interacting with them, and/or activate and manage said machines and/or infrastructures of said plants and/or special areas with the possibility of interfacing also with automation systems of third parties installed in said or other sites and/or with said vehicles and aircraft, and/or ensure the protection, safety and integrity of the components and devices responsible for storing said data and parameters;

the module 103 for electrical power supply and connection, may include devices for the power supply of the modules (even in emergency conditions) for the management and control of said infrastructures present in the monitored site (for example, machines, lighting systems, passages motorized, alarmed entrances, antifire, helipads, etc.).

Figure 3A:
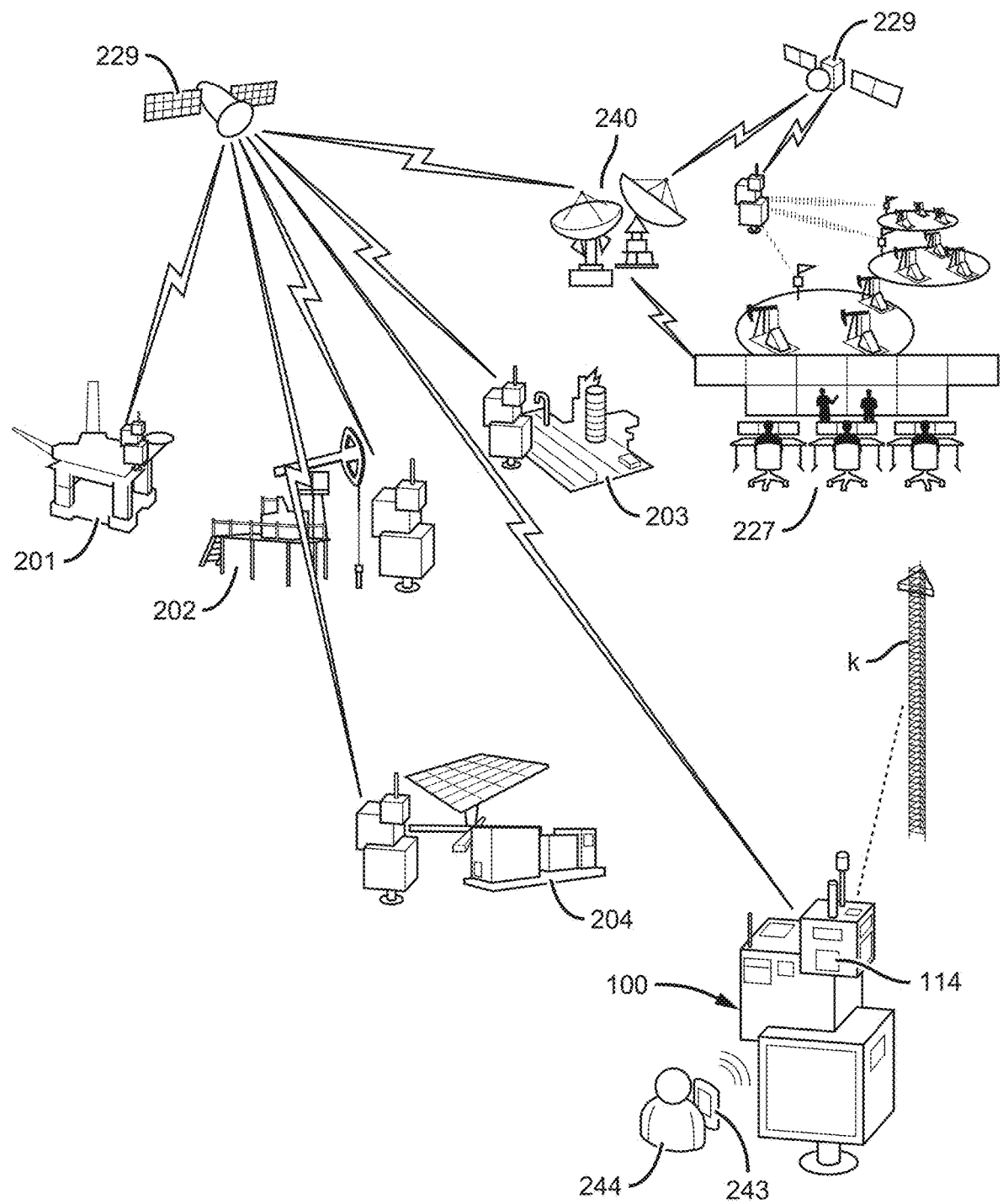
FIGS. 3a, 3b, 3c, 3d, 3e, 3f, 3g represent the inter-connected functionalities and features of the multifunction apparatus with other devices, assets, and other multifunction apparatuses.
Figure 4C:
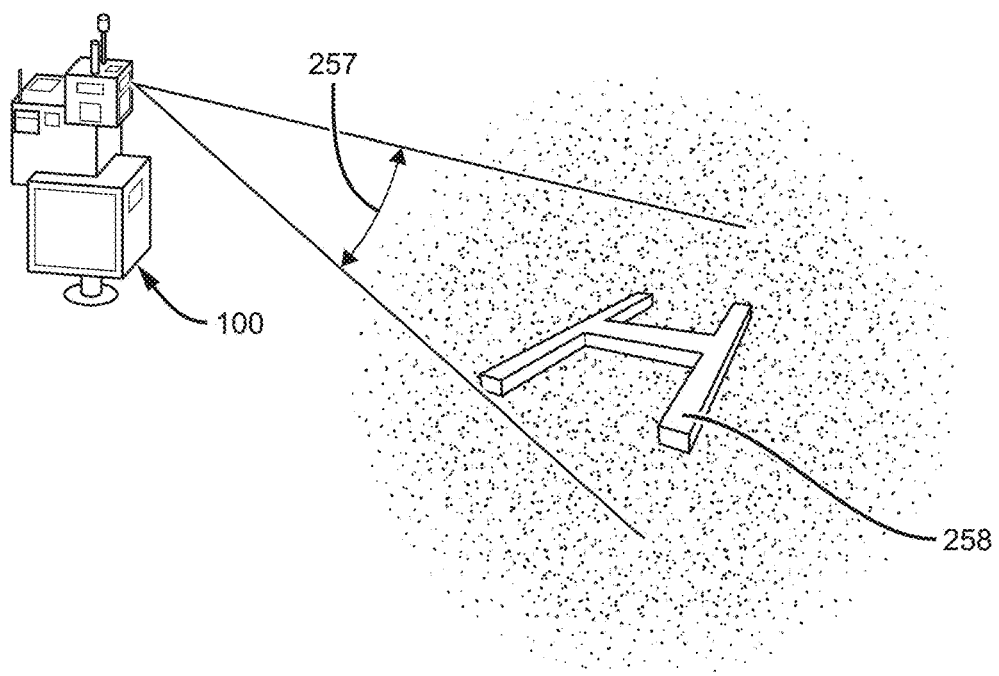
FIGS. 4a, 4b, 4c represent the communication functionalities and some fields of application of the multifunction apparatus such as without any limiting intent, the Oil & Gas sector, the avionics/aeronautical sector and for night flight applications.
Figure 4A:
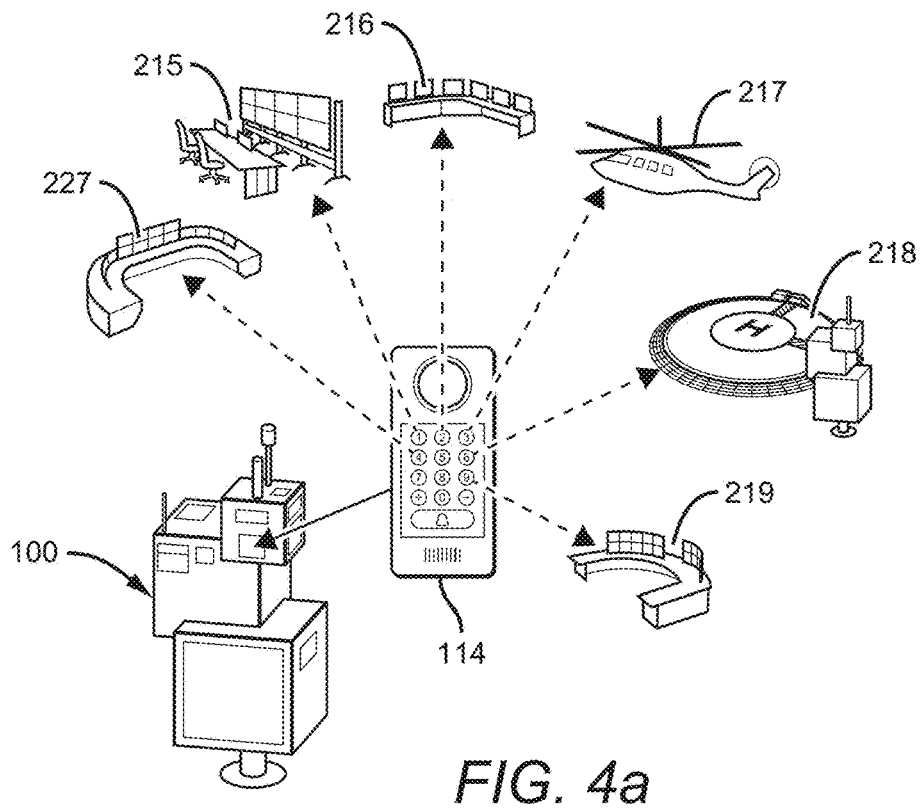
Figure 4B:
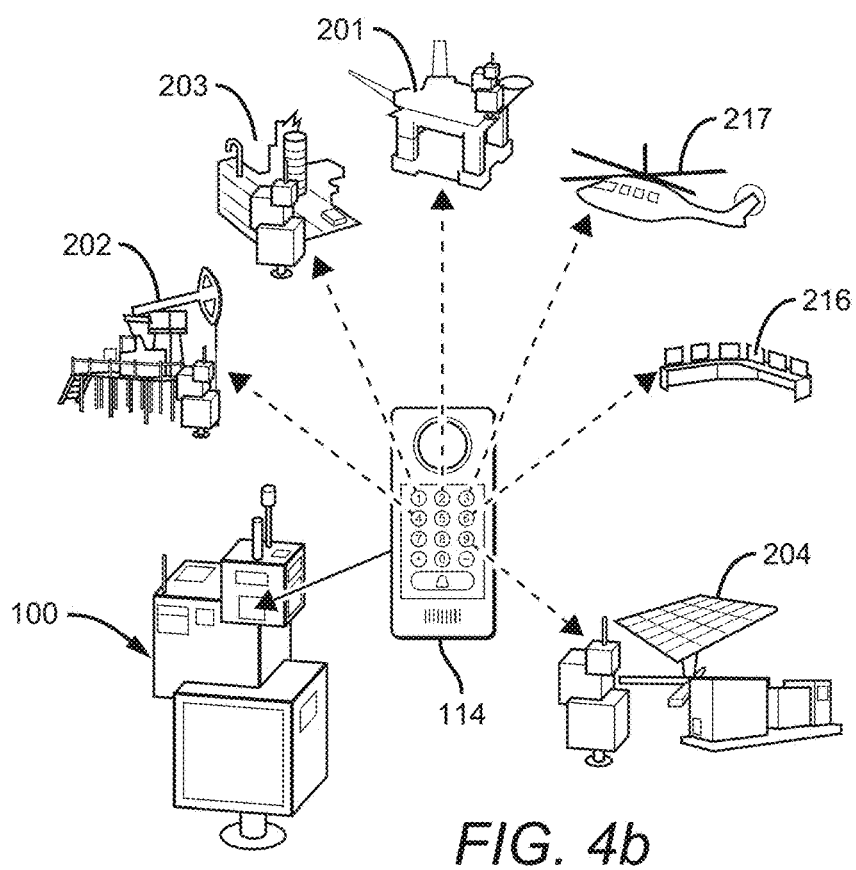

Going even more in detail, the module 101 can integrate telecommunication devices comprising:

a modem 115 and related router 111 (for example, with several RJ45 WAN/LAN ports) cooperating with a cellular broadband antenna 123 (communicating with terrestrial radio stations 4G, 5G, LTE, etc. as also shown with the reference "k" in the diagram of FIGS. 3a/3d) and a satellite antenna 132 suitable to allow the connection of the multifunction apparatus 100 to the internet from any geographical point. Said antennas 123, 132 allow, for example, an audio-video-data transmission (via Internet Service Providers 240 in FIG. 3a):

among the various multifunction apparatuses 100 which are installed in the sites to be monitored, for example positioned in offshore platforms (reference 201 FIG. 3a) and/or terrestrial production plants (reference 202 FIG. 3a) and/or near oil or gas extraction wells (reference 203 FIG. 3a) in storage areas and/o sites with regard to the creation of clean energy (reference 204 FIG. 3a) and the like, and/or to operating rooms and/or data centers (hereinafter also referred to as "control centers") is located in remote (see, for example, reference 227 in FIG. 3a) and in the monitored site itself such as fire brigade stations, company control rooms or health emergencies or civil protection or similar;

at least one VoIP device, which is part of a more complex device 114 for access control, to be explained better later on, configured to allow environmental and background listening for security purposes and to make calls and video calls to:

the aforementioned control centers such as, for example, emergency health and emergency response stations (reference 227 in FIG. 4a), company operational centers (for example, flight operators 215 in FIG. 4a), Civil Protection or Fire Brigades (ref. 216, 219 FIG. 4a), and/or other multifunction apparatuses 100 located anywhere, for example with those installed near helipads (reference 218 in FIG. 4a), on other oil & gas extraction sites both onshore and offshore (reference 201, 202, 203 in FIG. 4b), in correspondence with sites for the collection of clean energy (reference 204 FIG. 4b) or even in other plants and/or complex areas to manage and monitor, operators and staff of the monitored sites, through their own smartphones, PDAs and/or tablets, said land, sea and air operating means (e.g., in the case of Oil & Gas plants, with the various merchant ships, oil tankers, as well as with aircrafts as shown in FIGS. 4a and 4b with the reference 217).

Without any limiting intent, said VoIP device comprises a microphone, a speaker, a keyboard, preferably backlit (see ref. 114 of FIG. 3a) and a high-resolution video camera (1080p—FHD video);

a special "telephone backup" which includes and uses the aforementioned routers 111 and modem 115 mainly for calls to special or emergency numbers (not reachable from satellite terminals) or where the traditional cellular network is absent, temporarily out of order or for simple savings on the rates of VoIP and/or satellite operators (such as, for example, Thuraya, Iridium or Inmarsat).

For this purpose, the telephone backup can comprise and cooperate with the antennas 123, 132 for cellular and satellite broadband network, both managed by the aforementioned router 111 and modem 115, and be associated with a telephone number which is always active and functioning even in case of failures and interruptions of normal cellular or satellite transmissions (for example, in case of failures of the aforementioned terrestrial radio stations located in the vicinity of the location area of the multifunction apparatus 100).

Through an authentication procedure (of a known type or, as will be seen shortly, suitably conceived), any smartphone, PDA or similar portable device, supplied to site personnel and/or authorized technicians (see again references 243 FIGS. 3a, 3d and/or "243 of FIG. 5d) can be used as a backup device.

It is useful to specify how any user for connecting and using the aforementioned telecommunication devices of the multifunction apparatus 100 must comply with specific instructions described in a "Security Label" (see, for example, ref. 150 of FIG. 5d) applied to one of its modules 101,102,103 (preferably on the highest module 101).

Said "Security Label" may also contain instructions in several languages (at least in English and/or a local language) and/or a data-matrix code (containing instructions in various other languages) with the authentication data for connection to the telephone function.

More precisely, the use of a data-matrix code prevents the "Security Label" from being excessively large in size to contain the various instructions in multiple languages and allows staff 244 (see FIGS. 3a, 3c, 3d) and/or any Other User Authorized to Access and use in a simple and rapid way the resources and communication devices of the multifunction apparatus 100 of the invention.

Of course, nothing prohibits the use of other known authentication systems such as facial recognition (or other anatomical characteristics of an individual) or the insertion of codes (pin, password, etc.) and credentials through, for example, the aforementioned keyboard of the VoIP device.

As a rule, this authentication procedure can be remotely managed, through any Internet Service Provider 240, by "Network Administrators" in charge of managing communications and the security policy of all the multifunction apparatuses 100 located on the site monitored.

Figure 5A:
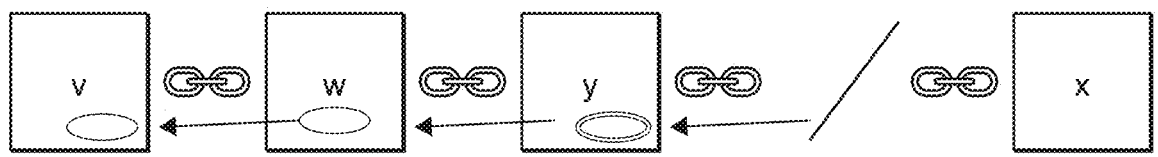
FIGS. 5a, 5b, 5c, schematically show how to preserve and process the data and parameters acquired by the multifunction apparatus of the invention and/or its plants and/or special areas and/or monitored vehicles.
Figure 5B:
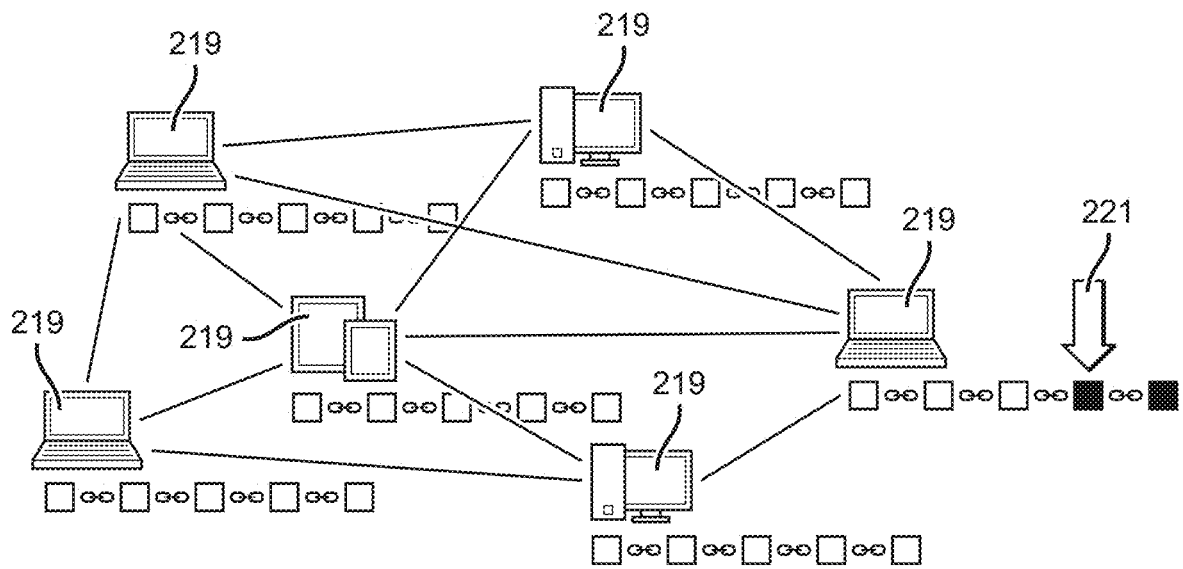
Figure 5C:
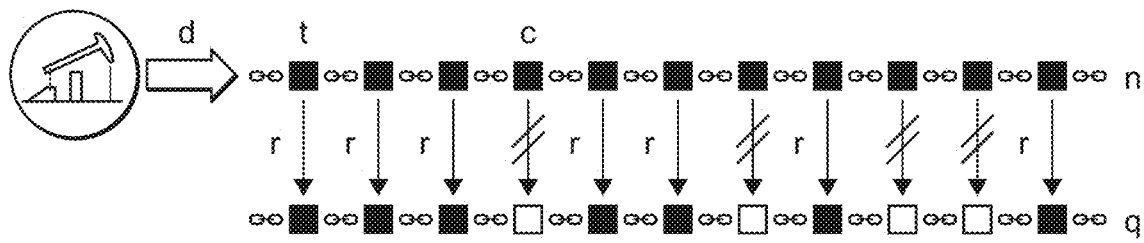
Figure 5D:
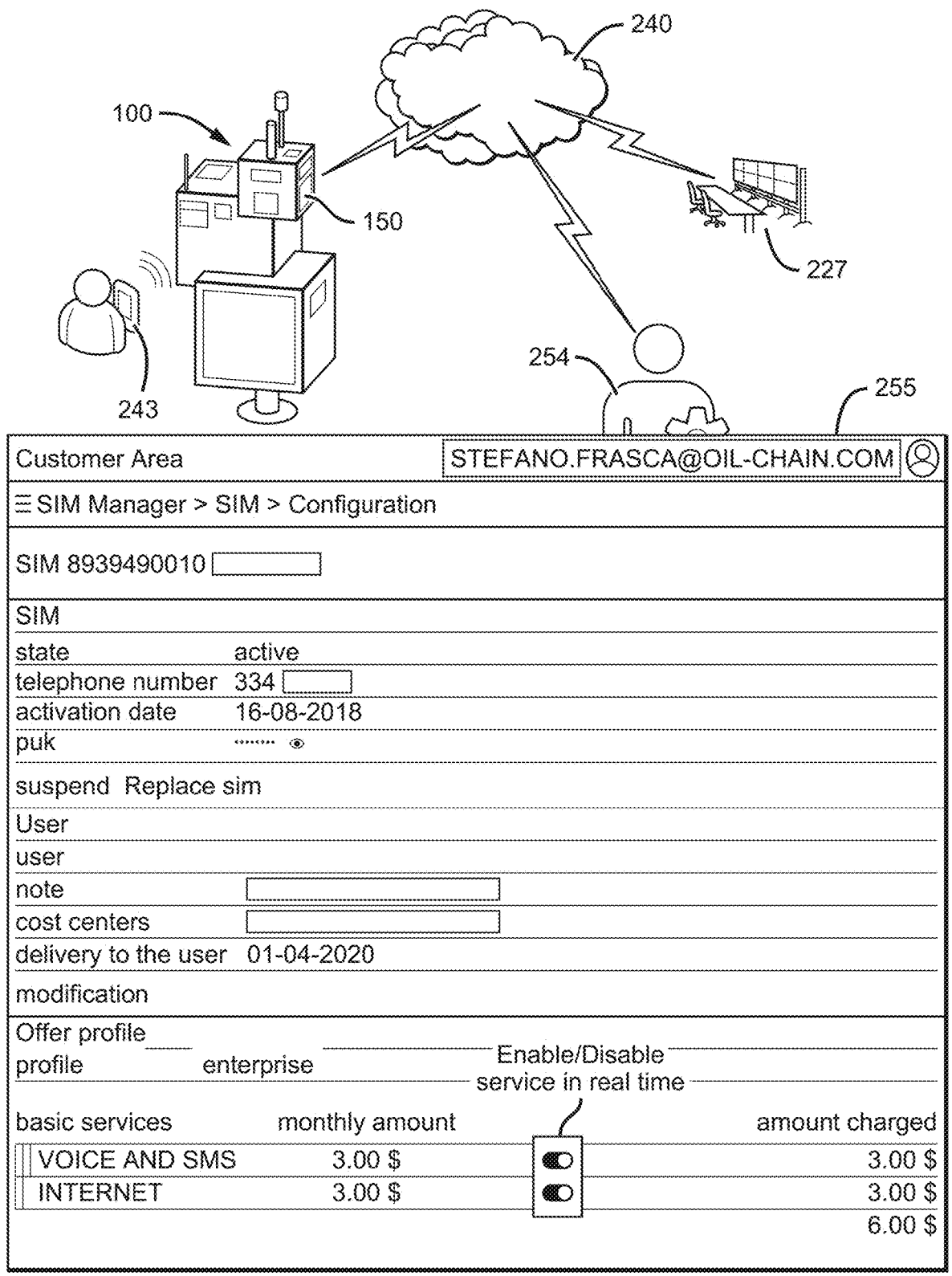
FIG. 5d represents an authentication mode, and related devices, for the use of the multifunction control and management apparatus of "plants and/or special areas" of the invention and the distributed network functionality by using a double layer Blockchain.

An example of "Network administrator" and the relative "Panel for the authorization settings" associated with each multifunction apparatus 100, are shown in FIG. 5d respectively with the references 254, 255.

As already mentioned in part, the cubital module 101 can also comprise a monitoring device preferably comprising:
- a video surveillance apparatus 121 for detecting, for example, objects abandoned in the vicinity of the multifunction apparatus 100 of the invention and/or for the verification of anomalous behaviors (for example, attempts to tamper with or sabotage the infrastructures or automations of the site or the multifunction apparatus 100 itself), and/or
- the aforementioned access control apparatus 114 in the monitored site, and/or
- a secondary actuator 120 managed via TCP/IP connected to said access control 114 which can at least be used to open an access gate to the monitored site or to specific areas of the same,
- a station 119, 124 for acquiring meteorological and environmental data and any geolocation devices.

More specifically, said video surveillance apparatus 121 may comprise:
- at least one camera 121 without moving parts and with double "fisheye" type optics, suitable for viewing and recording what happens within its range of action, preferably of the order of 720°, said camera 121 being able to integrate also video analysis functions, and
- a primary actuator 118 also managed via TCP/IP and cooperating with said camera 121, whose purposes will soon be more understandable.

Said camera 121 is configured to simultaneously record the acquired images on local hard disk/micro-SD and/or, on Network Video Recorder 144 and via the internet and/or on similar remote devices (room servers/control or control centers and/or smartphones, or similar devices, supplied to authorized personnel and operators).

During the acquisitions carried out by this camera 121, the event of a detected anomaly corresponds to the activation of an alarm, for example integrated with the multifunction apparatus 100 or already provided in the monitored site and normally comprising light and/or sound emitters.

Of course, nothing prevents similar and simultaneous alarm signals from being sent automatically, e.g. through the same communication and data transmission devices of the multifunction apparatus 100 of the invention, also to the various control centers, already listed above.

Furthermore, the camera 121 can be set up for facial recognition of the personnel operating in the monitored site and can be set up to be handled and monitored remotely with viewers in VR (Virtual Reality) mode.

Besides, said camera 121 can integrate "face recognition" systems and softwares which allow to compare the biometric data of an individual, detected in real-time, with those pre-stored on special digital registers.

Furthermore, nothing prevents said camera 121 from providing and/or cooperating, together with the other cameras 117, with special "intelligent" motion detection software capable of distinguishing the real movements of individuals or vehicles from "environmental" ones and consequently identifying, violations of the rules in force in the monitored site or anomalous and dangerous situations.

It is therefore evident that with the camera 121 of the multifunction apparatus 100 it is possible to obtain extremely accurate metadata to allow the activation of alarms and/or to undertake specific corrective measures for the security of the site.

The video surveillance apparatus also includes one or more cameras 117, up to 3600 of vision, which support camera 121 for visual monitoring even in low light conditions, particularly suitable for:
- intrusion detection, even in the presence of fog,
- remote fire detection (example also suitable in the aeronautical sector for all sites and/or helipads unmanned and without fire-fighting operators), where control room operators 227 could alert pilots of an aircraft fire presence and activate the 'fire extinguishing system,
- detection of faults in underground heating systems for melting ice; for example, for the safety of helicopter rescue operators and for the purposes of predictive maintenance, this application is essential for the remote monitoring of helipads in cold environments and at high altitudes where "de-ice" systems are required.

A further system for identifying the individuals who gravitate to the installation site of the multifunction apparatus 100 is defined by the access control apparatus 114, already mentioned in part.

Said access control apparatus 114 integrates an RFID reader for the certification of all accesses to the monitored site, obviously without excluding other types of equivalent readers suitable for the same purpose.

This access control apparatus 114 is therefore particularly useful for the identification of internal or external personnel (e.g. operators for cleaning the site or for mowing and containing external vegetation), or of any individual with a special badge (or similar) readable by the RFID system.

The station 119, 124 for the acquisition of meteorological and environmental data can instead comprise at least an "all-in-one" multi-parametric sensor 124, without moving and integral parts, for example: a thermo-hygrometer and/or a rain gauge and/or a sonic anemometer and/or a pyranometer (or solarimeter) and/or a barometer and/or a lightning sensor, a ceilometer and/or an electronic level.

The data detected by this station are usually stored in a dedicated datalogger 119, inside the module 101 (to preserve the detected data), and/or, as will be described later, made available remotely (e.g. to the control unit) via the internet.

Figure 2:
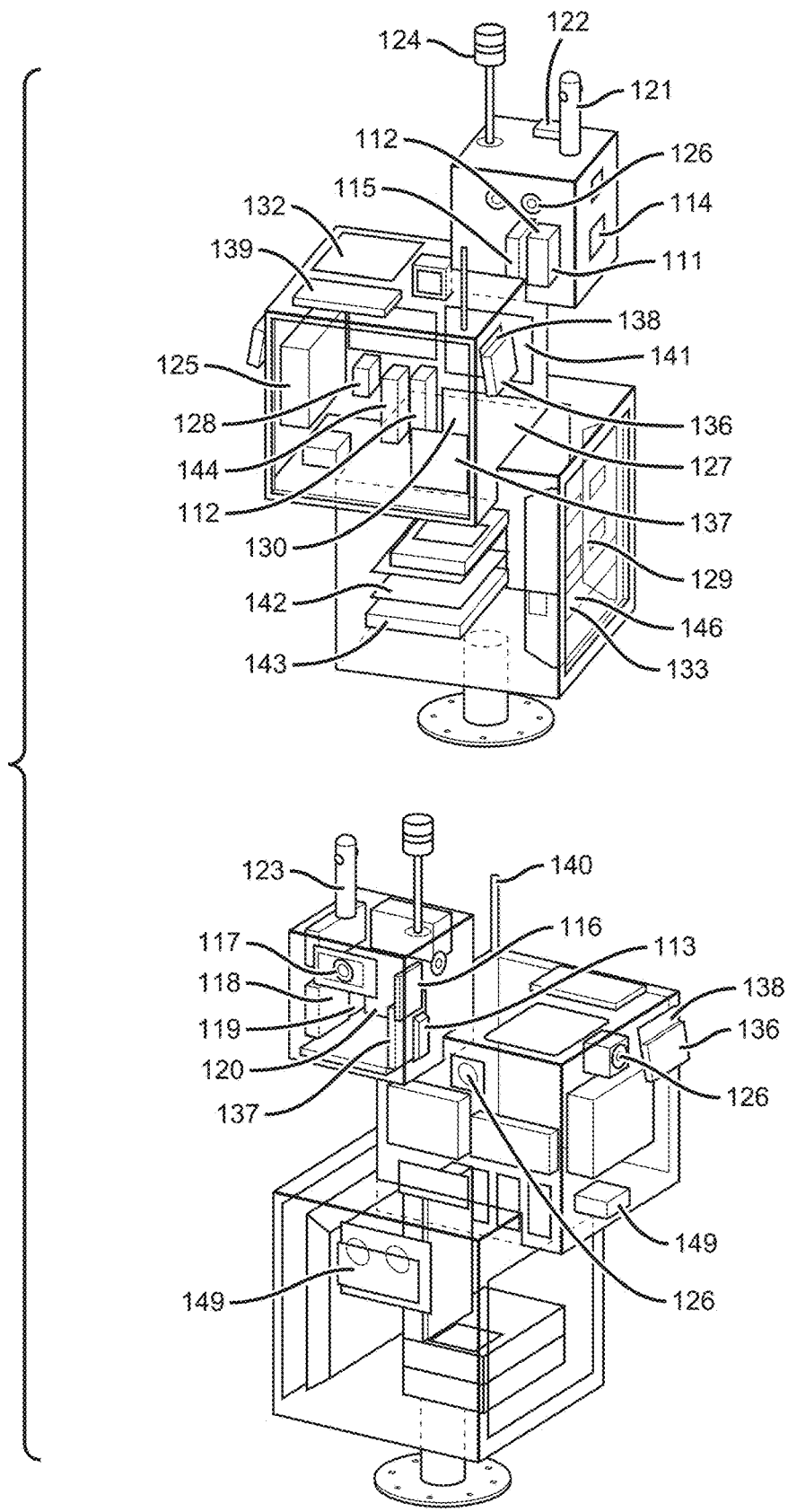
FIGS. 2, 2a represent a scaled isometric and 3d view of the multifunction apparatus as for a second embodiment.
Figure 2A:
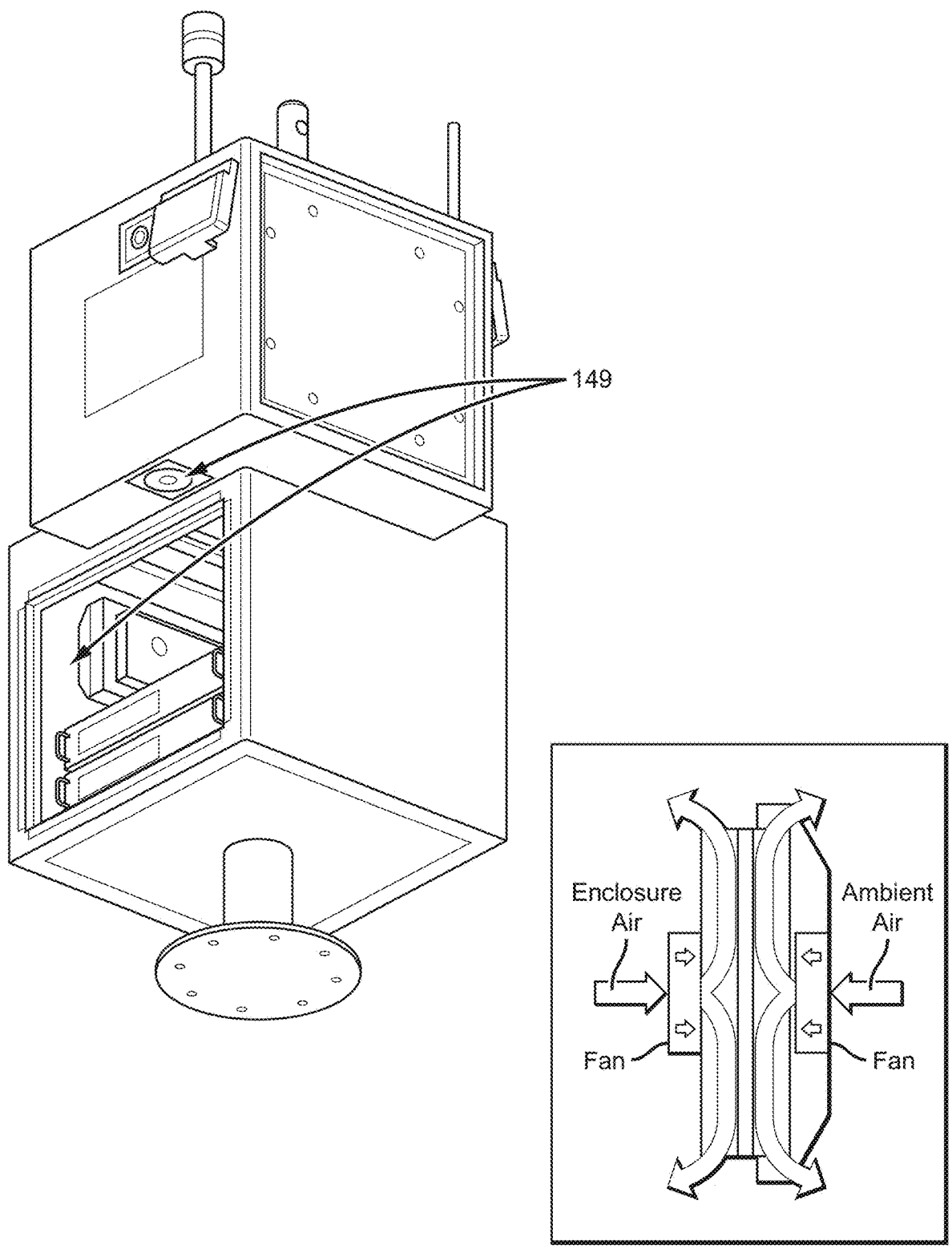

As shown in FIGS. 1 and 2, camera 121 and multiparametric sensor 124 are preferably positioned externally to the module 101 so as to more correctly explain their functions.

Fixed externally to module 101 there is also a Wi-Fi antenna 122 (FIG. 1) for the creation, among its other functions, of an Internet access (hotspot) to be used in case of emergencies or for any further eventuality.

Preferably, the module 101 can further comprise:
- an anti-vandal and anti-intrusion reader 113, possibly also usable for a further verification of the accesses, and/or
- a switch 112 for the connection of the electric and electronic devices already provided, and/or other implementable, in said modules 101,102,103, to the computerized local network of the multifunction apparatus 100, and/or
- a further actuator 116 for the "hardware reset" of one or more of the internal and/or external devices of the multifunction apparatus 100 of the invention, controllable through both satellite broadband and cellular network.

For this purpose, inside the router 111 there are one or more contacts (not shown) normally open and connected to said actuator 116 for the interruption or restoration of the electrical supply of a motherboard 125 which, as known, manages the activation, operation and shutdown of the electrical and electronic devices of the multifunction apparatus 100 connected to it.

Of course, nothing prevents the reset actuator 116 from acting directly on one or more of said devices of the multifunction apparatus 100.

At this point, we move on to describe the "security, automation and digital recording" module 102, suitable for being coupled, in the manner described, with the module 101 just treated and with the module 103, which will be described below.

Module 102 provides devices and systems for the management, via Blockchain, of characteristic data (e.g. functional, productive, operational, etc.) of the monitored site and/or of any vehicles and aircraft operating or interacting with it; this represents one of the most innovative aspects compared to state-of-the-art multifunction apparatuses.

It is known how the Blockchain is based on a technology called "Distributed Registers" DLT among all the actors of a network and which allows an effective acquisition and safe storage of the data detected in the monitored site, effectively eliminating any risk of their tampering, manipulation and illegitimate alterations (e.g., hacking).

The Blockchain is in fact, as is known, a database:
- "distributed", that is, it can be shared by several users or participants, identical on all the nodes of a network (in other words, all the identified participants have access to the same information);
- "immutable", i.e. the database is an unalterable history of transactions thanks to the so-called "Block hash";
- "safe" as all changes are made only by transactions and/or interactions "signed" and authenticated by authorized participants.

The Blockchain provides agreed consensus mechanisms to provide an "adversarial trust" between all participants.

The Blockchain of the invention also uses private protocols that need to identify the identity and roles of all participants.

According to the invention, said Blockchain is any type of Blockchain according to all types of existing protocols such as Proof of Work, Proof of Stake, Proof of Elapsed Time, Proof of Authority, Proof of Capacity, Proof of Burn, SIEVE consensus protocol, CROSS-FAULT Tolerance and BYZANTINE-FAULT Tolerance and other future variants or combinations of the above.

Preferably it comprises a programmer who divides transactions and interactions into parallel flows so as to optimize its performance (compared to state-of-the-art serial Blockchains) and maximize the security of the acquired data against any possible manipulation.

For this purpose, according to the invention, a plurality of digital computing and recording devices 130 are provided on which the Blockchain protocols are implemented and installed.

Such digital computing and recording devices 130 may include low energy consumption ASICs and/or CPUs and/or GPUs and/or FPGAs, DSPs, APUs (or their future evolutions), and are connected both to the local computerized network inside the multifunction apparatus 100 and to the internet. through the aforementioned modem 115 and related cellular and/or satellite antennas 123, 132.

Said digital computing and recording devices 130 can use other storage devices or volatile or non-volatile memories which include but are not limited to ROM, RAM, SDRAM, DRAM, SRAM, FLASH MEMORY, MRAM, D-RAM, OR P-RAM.

Figure 3B:
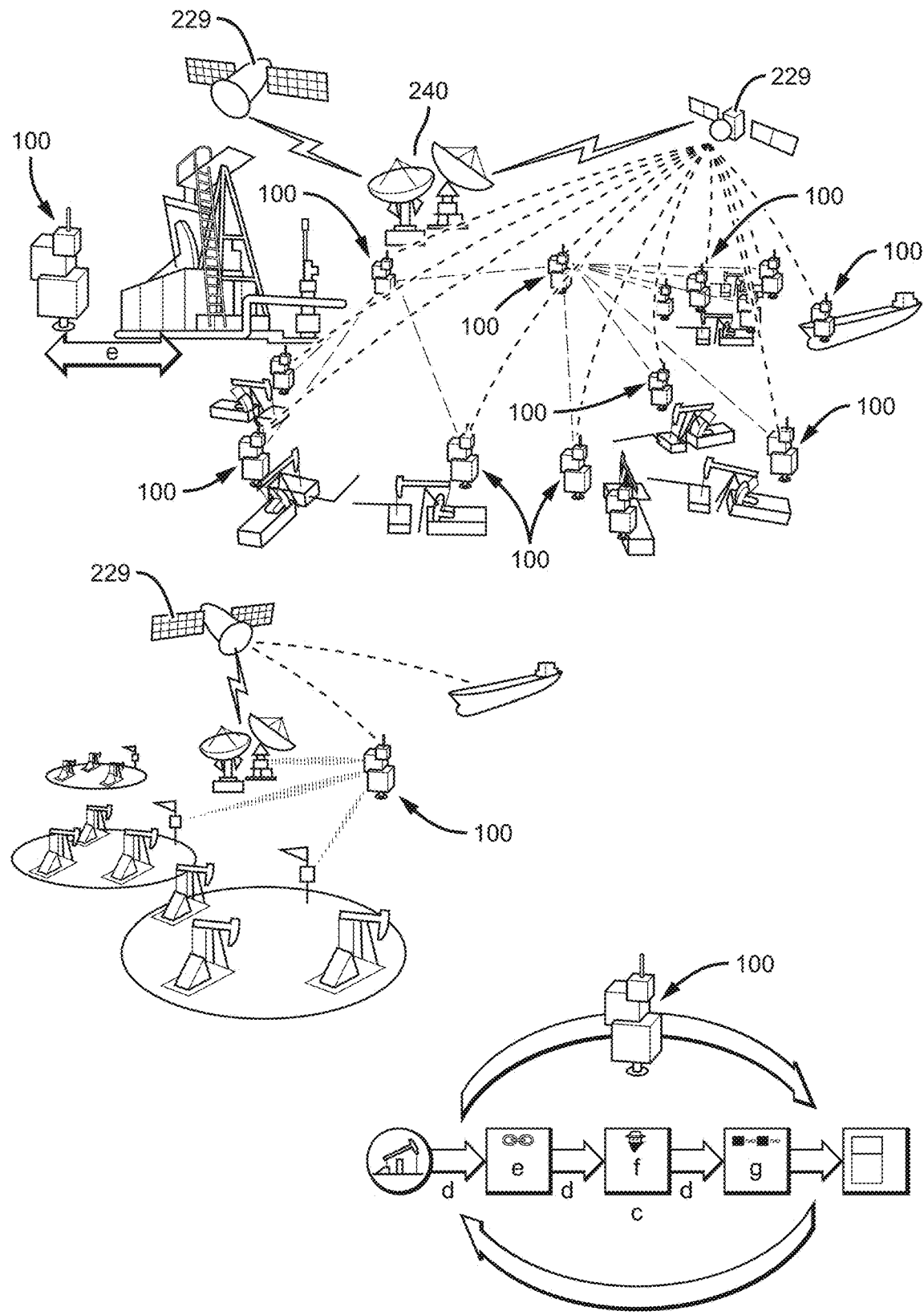

Said digital computing and recording devices 130 can therefore connect with similar devices of other multifunction apparatuses 100, wherever they are located and geographically located, so as to create a closed peer to peer distributed network for verifying the identity of the participants (see FIGS. 3b, 5a)

All the digital computing and recording devices 130 can receive in real time and substantially at the same instant all the data and parameters collected by the various sensors (or similar devices) of different types wherever located in the monitored site and/or, as will be seen, the relative and transmitted ones. by the said possible means that operate and interact with the monitored site.

In the specific case of Oil & Gas plants, cited only as a non-limiting example, said data may include at least:
- the process variables monitored by the head sensors of the extraction wells (FIG. 3a or 3b) such as the instantaneous well pressures, the temperatures, the extracted flow rates (measured through special meters, also owned by third parties), and/or any other parameter related to the correct functioning and management of the extraction and production processes (henceforth globally referred to as "operating data"), and/or
- fundamental information for business and company safety such as, without any limitative intent, the quantities of oil (or gas) extracted, the quantities of the refined product, the quantities stored or transferred to the final Customer's oil tankers, etc., that is all information that has a direct connection with the economic aspects (for example, for billing to the final customer), management and company know-how (from here on then generically called "company data").

The digital computing and recording devices 130, listed above, can locally process the aforementioned data on the basis of a certifying algorithm (SGX) and one of the aforementioned protocols, e.g. PoET (also known as "elapsed time test" protocol), Proof of Burn, proof of capacity or SIEVE consensus protocol, Proof of History, which will decide randomly and at arbitrary time intervals which of the digital computing and recording devices 130 will have the right to add, to time to time, the data in the Blockchain.

These data are organized in data blocks linked together.

As, for example, shown in FIG. 5a, the block "v" includes the data of a first well while the blocks "w", "y" . . . "x" contain the functional data of the other wells of the Oil & Gas site controlled by the multifunction apparatuses 100 of the invention.

An asymmetric cryptographic algorithm, for example of the SHA256 type, ensures that the acquired data added to the Blockchain is safe and unchangeable.

In other words, the data blocks of the chain of FIG. 5a are cryptographically connected to each other by means of specific hashing values so that any alteration or modification of one of them would be easily and immediately detectable; in fact, the correlation between the hashing values of two consecutive blocks would be missing.

Since, as mentioned, the acquired data can be processed locally through known "edge computing" systems, the use of centralized servers, therefore more vulnerable, becomes completely superfluous and obsolete.

All of what has been said so far can be exemplified with the example reported below and referred, without any limitative intent, to the monitored site of FIG. 3a.

Let us assume that the module 102 of the multifunction apparatus 100 comprises a number "n" of ASICs, FPGAs, CPUs, GPUs, DSPs, APUs or similar devices (e.g. N=5) for each sensor associated with the plurality of extraction wells of the site or other infrastructures (for example, storage areas, gas extraction platforms, extraction pumps, offshore platforms, oil tankers and merchant vessels, helipads, etc.).

Said ASICs, FPGAs, CPUs, GPUs, DSPs, APUs, connected together, receive from said sensors (or similar devices) the same reading and/or telemetry data, in real time and with completely negligible delays.

An algorithm based, for example, on the said PoET protocol or Proof of Burn or proof of capacity or SIEVE consensus protocol, decides, on a randomized basis, which ASICs, FPGAs, CPUs, GPUs, DSPs, APUs, even away from the site, should "Wake up" among those supplied with the multifunction apparatus 100.

This ASIC, FPGA, CPU, GPU, DSP, APU will have the right to enter the data received from the aforementioned sensors in a new block of the Blockchain.

As anticipated, such data will be encrypted (through, for example, the aforementioned hashing function SHA256) so as not to be alterable or tampered with; even if only a single digit of the cryptographic code was changed, it would be totally different from the original one and would no longer be recognized as valid.

In fact, while the "awakened" ASIC, FPGA, CPU, GPU, DSP, APU has the right to build and add, as seen, a new block to the Blockchain, the others verify that its hashing value is valid, i.e. compliant to that of the block that precedes it in the chain.

This "trick" favors the immutability of the acquired data and allows all participants in the Blockchain, adequately identified, to know in real time and at any time, even remotely, secure and certain data.

Each block of the Blockchain is in fact connected to the previous one as the hashing value of the previous block will always be involved in the definition of the hashing value of the next block; any inconsistencies and alterations would therefore be easily detected.

According to a preferred form, the DLT Distributed Network of the invention is a 2-level network (2-layer DLT) since two different types of Blockchain, with different degrees of authorization, are used for the conservation and protection of the data and parameters detected. and acquired (for example, in the case of an Oil & Gas site, those relating to the extraction and production of gas and oil).

More precisely, the data and parameters that are not critical (e.g. The aforementioned "operational data") can be performed on a public Blockchain while the more significant and sensitive ones (e.g. the "company data" previously mentioned) can be managed through a Blockchain that requires necessary access authorization and authentication.

Therefore, the aforementioned "operational" data (or any other data and information of equal content and characteristics) will be made accessible to anyone, in particular in the specific case of an Oil & Gas site to maintenance technicians, equipment and process control personnel, etc., while the "corporate" ones will remain available only to authorized users or entities such as, without limitative intentions, corporate managers, customers, institutions and governments, owners of the mining land, in general to all those involved in the business both from the point of view management and economic.

As clearly shown in FIG. 5c, the 2-level distributed network from the invention includes:
- a first level "n", deeper, closed (i.e. only the identified Parties/Users can have authorized access), also called "main chain or Blockchain", and
- a second level "q", more superficial, which does not require the recognition of the Parties/Users (therefore public and open), also called "superficial chain or Blockchain".

According to the invention, the main Blockchain "n" will receive and manage, in the ways already described, all the data, i.e. both operational and corporate data, extracted from the monitored site and will be defined by known and authorized nodes.

An appropriate and well-known PoET protocol (as already anticipated also known as "Proof of Elapsed Time") or PoA (Proof of Authority) or Proof of Burn or proof of capacity or Proof of History or SIEVE consensus protocol, will choose, in a completely random and thanks to a verification of authority within the same network, those nodes that will write the blocks of the main Blockchain.

At the same time, "smart contracts", written in an appropriate language, will distinguish from the totality of data "d" organized in the main Blockchain "n" corporate data "c" (that is, the most sensitive) from operational "t" (non-critical) data, attaching the latter to public writing transactions on blocks of the superficial Blockchain "q" (in industrial practice, "smart contract" means a computer protocol for the execution of a contract between two parties, said protocol being implemented on the nodes validators of a Blockchain and whose result represents a transaction).

In other words, as shown in FIG. 5c, all the data collected "d" referring to the monitored site "p", e.g. Oil & Gas, will initially be organized and written in blocks of a main closed Blockchain "n" in which blocks "c" of sensitive data (e.g. The aforementioned company data) and "t" blocks for non-critical data (i.e. aforementioned operational data), the latter, once recognized by appropriate smart contract algorithms "r", being "transferred" to a second, more superficial, public Blockchain "q".

Therefore, a 2-level Distributed Network is created, where in the deepest and most closed level only those sensitive company data "c" will remain, accessible only to identified and authorized Parties/Users, while in the more superficial and public level all the remaining data will flow "t" of the monitored site, judged non-critical by specific smart contracts.

From the above, it is clear the need to protect not only the acquired data, adopting, as mentioned, Blockchain systems, but also the various hardware devices and components that implement it.

Figure 3C:
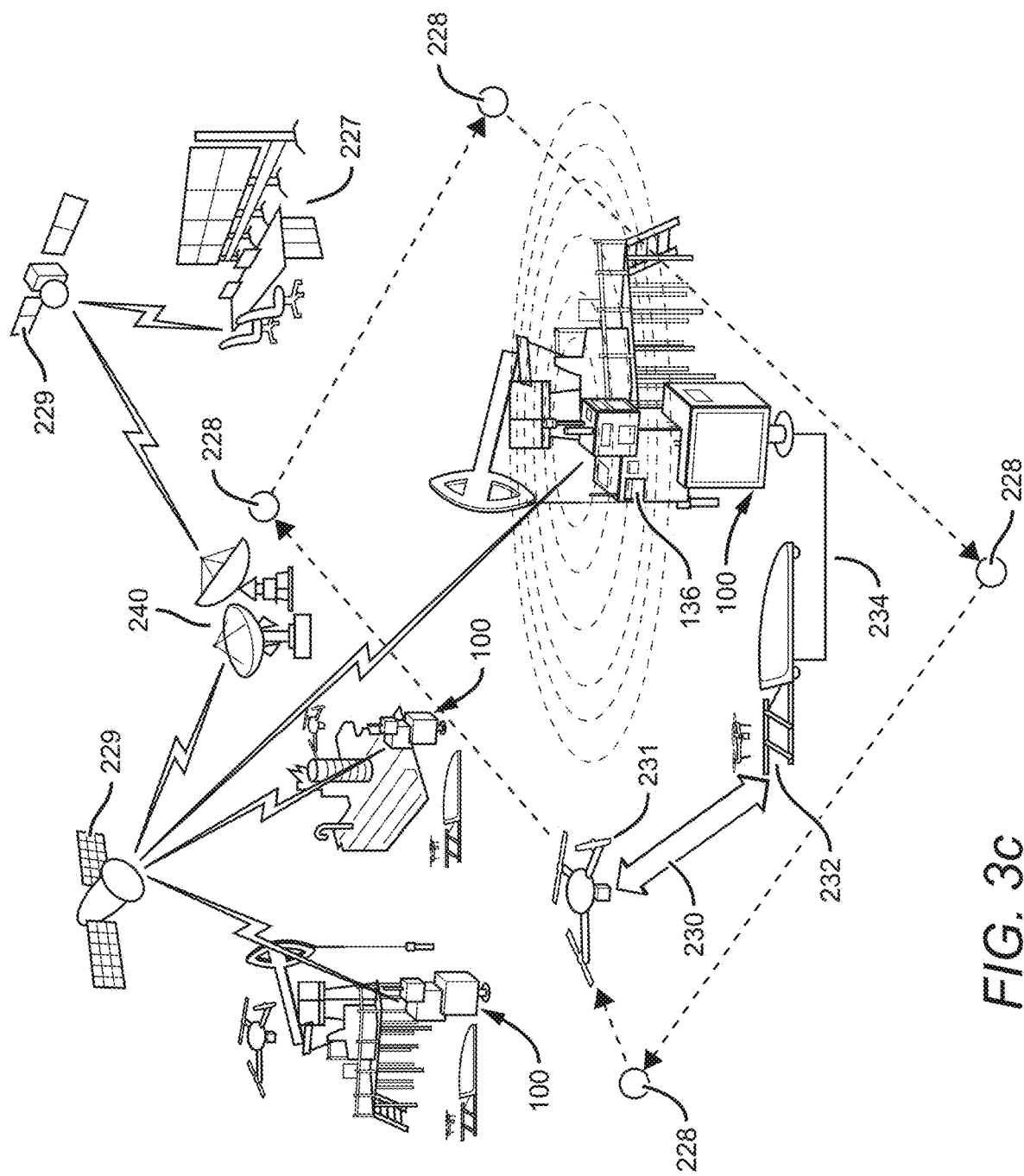
Figure 3D:
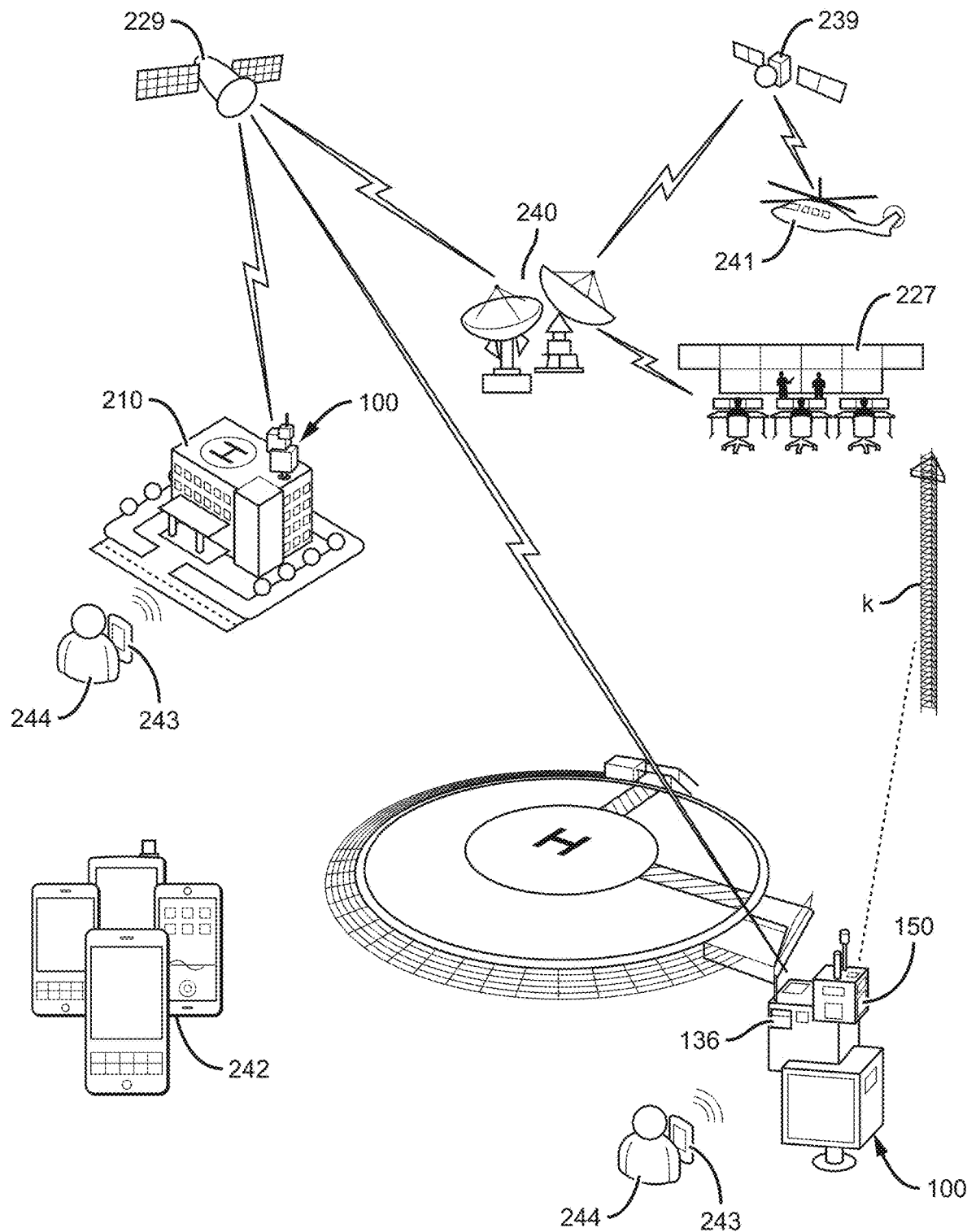
Figure 3E:
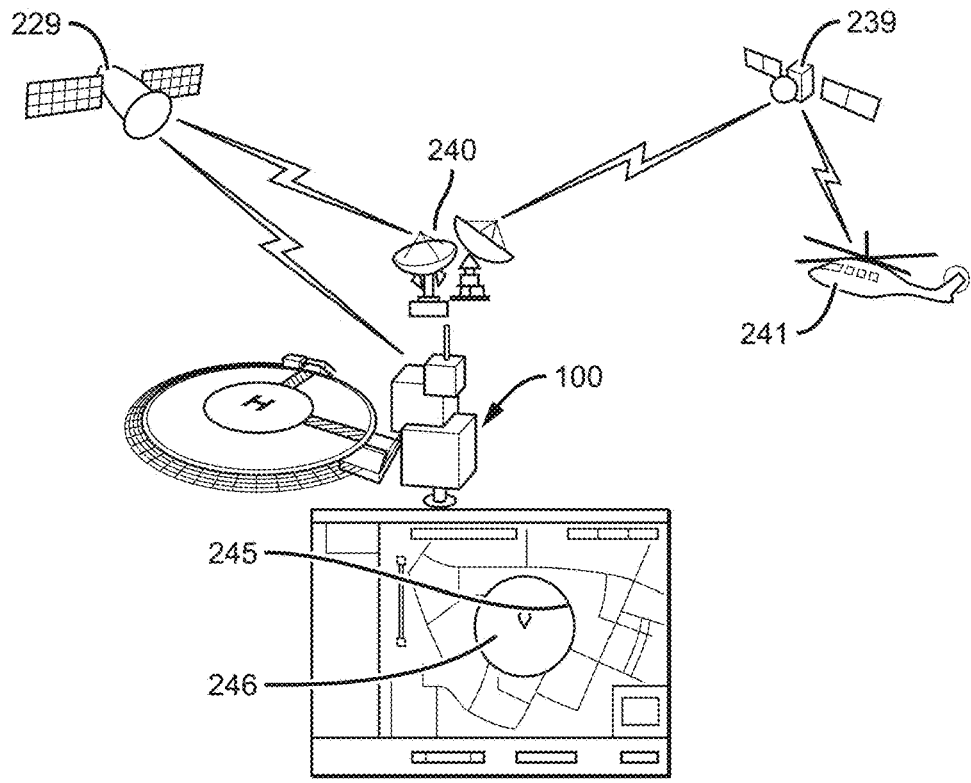
Figure 3F:
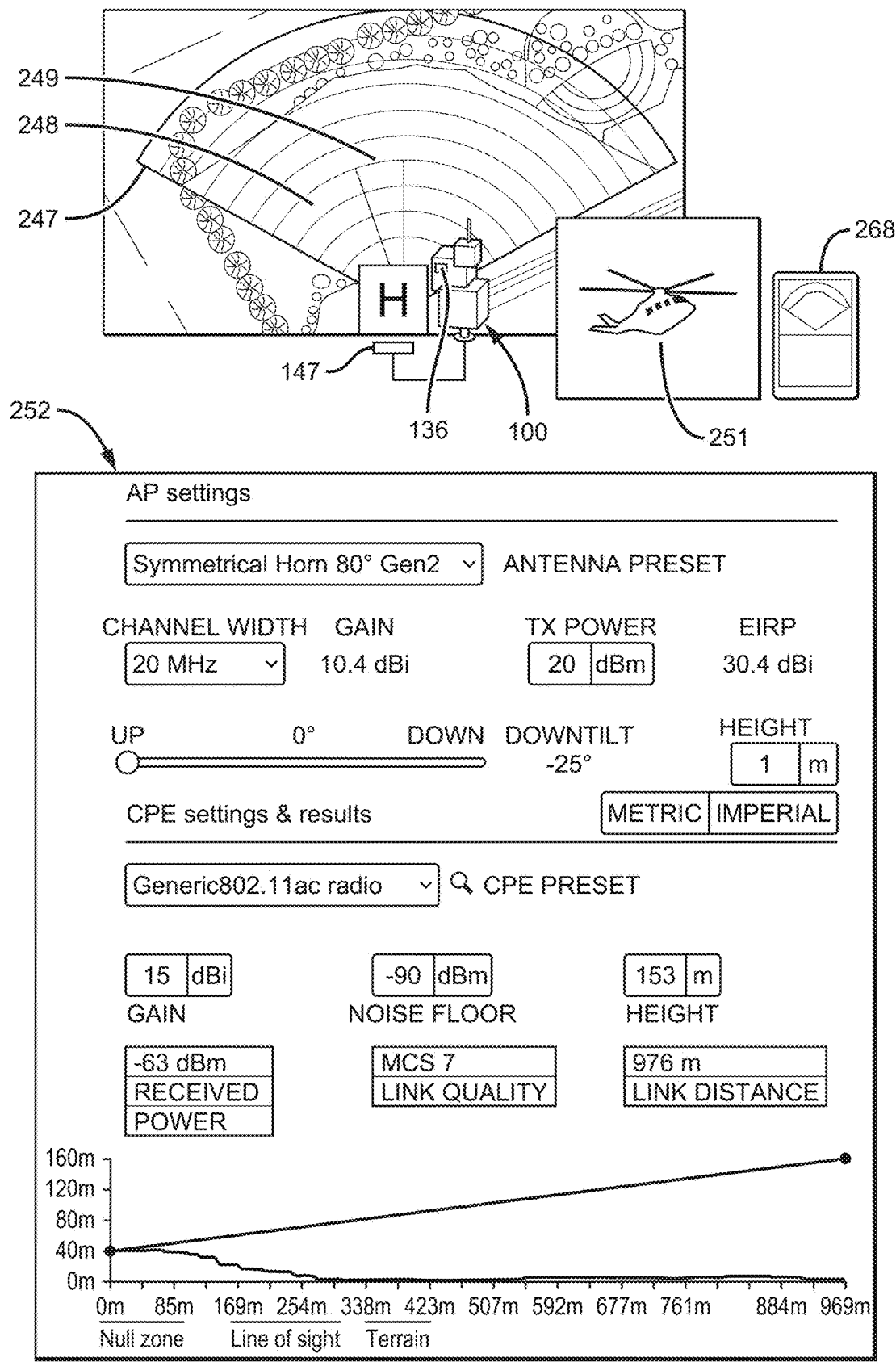
Figure 3G:
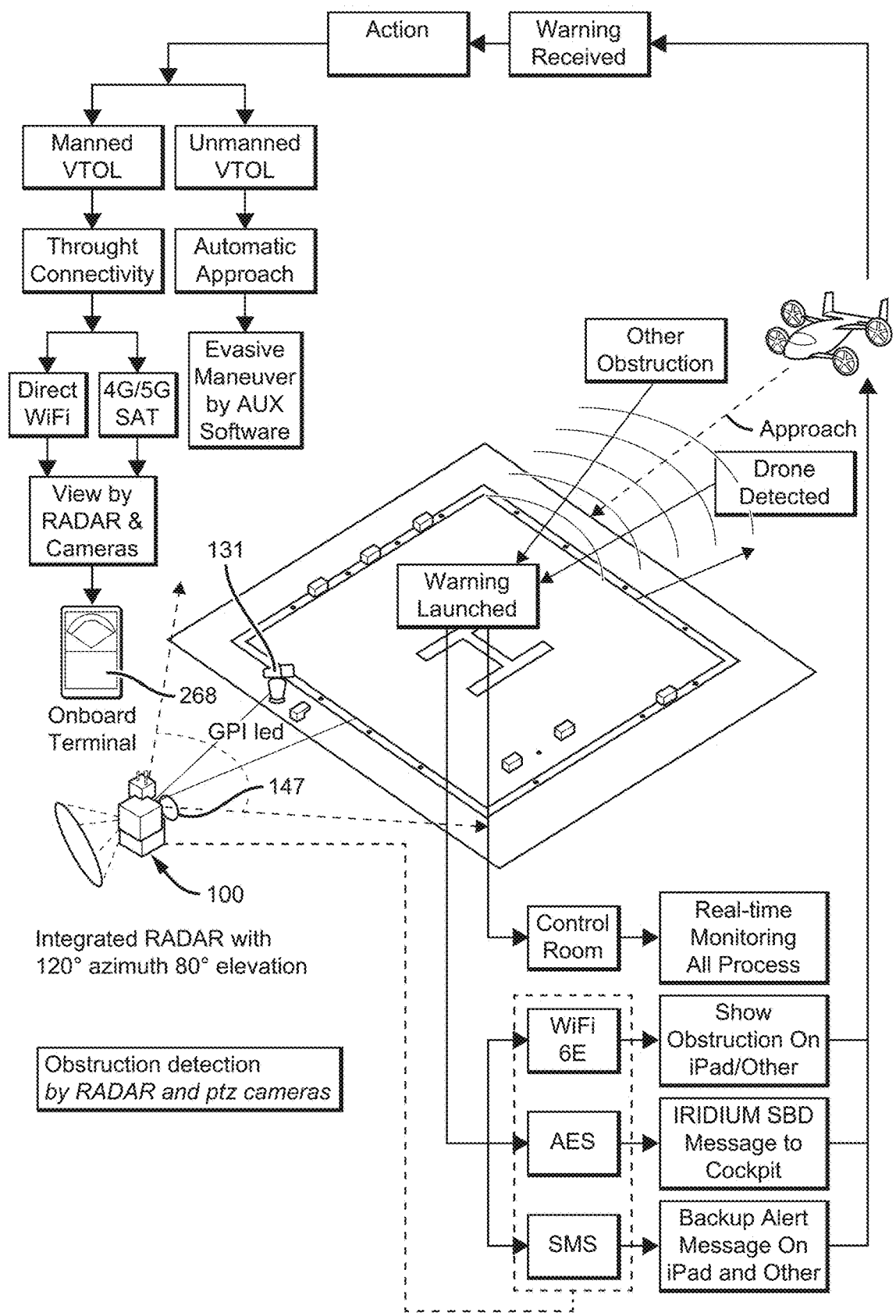

For this purpose, the module 102 of the multifunction apparatus 100 can integrate a plurality of safety devices consisting preferably of:
- anti-intrusion and anti-tampering means in the operating area of the multifunction apparatus 100 of the invention connected and managed directly by the aforementioned motherboard 125, and/or
- a plurality of sensors 126, preferably at least four perimeter sensors with radar technology, suitable for detecting any movement of individuals or land and air vehicles (for example, work vehicles or aircraft) interacting or operating in the vicinity of the multifunction apparatus 100 and in the surrounding areas,
- an additional long-range radar 136 for specific needs, which can also be installed in Plug & Play mode in a special connection 138 already equipped with electrical power and interfacing to the internal computerized network and obtained in one of the modules 101,102, 103 of the multifunction apparatus 100 (by way of example, on the module 102), and/or
- a hybrid PTZ camera 131 (i.e. of the "Pan, Tilt and Zoom" type) with double optics (normal megapixel and thermographic vision) and with vertical and horizontal visibility, day and night, also at a long distance, and equipped with a laser illuminator, which can be used:
  to detect any intrusions in the installation site of the multifunction apparatus 100, said laser illuminator allowing, in fact, to detect individuals and vehicles at great distances (e.g. even beyond 1000 m away) and in low light conditions, as an auxiliary device for the management of ancillary infrastructures of the monitored site, such as any helipads (or landing and take-off runways) and/or the means that use them (e.g. aircraft and helicopters); we will return to this aspect shortly with specific reference to FIGS. 3c, 3f and 3g).

By way of example, it should be noted that the PTZ camera 131 and the relative laser illuminator can be managed directly by the personnel (pilots) on board these aircraft using special flight software (e.g. installed on specific devices provided to them such as smartphones and/or PDA and/or in the relative control console of their cockpit) and known communication protocols, so as to evaluate and avoid risks deriving from the approach to said helipads, especially in case of night flight and support for NVIS missions (Night Vision Imagining System).

Said PTZ camera 131 of the multifunction apparatus 100 installed, for example, in the vicinity of a helipad, can be configured with respect to visual references (for example, a house, a tree, a trellis, etc.) present on the territory at different distances from the camera itself and across its view.

Each of these distances is then stored on the navigation instruments of the aircraft as "preset" values, generally depicted as virtual buttons arranged next to the digital navigation maps (for example, "preset1" will indicate the vision with optical zoom of the reference closest to the helipad, with "preset2" the vision with optical zoom of the intermediate distance reference and with "preset3" the vision of the farthest reference).

In general, an identification name can be associated with each "preset", for example related to the distance of the visual references with respect to the helipad in which the multifunction apparatus 100 of the invention is installed.

Each of said "presets" therefore identifies an effective visibility index for the pilot on the basis of which he can set, as known, the best and safest approach and landing operation.

In case of poor lighting, for example, the pilot of the aircraft can activate the most suitable "preset" for positioning the beam of the laser illuminator (ref. 257 FIG. 4c) of the PTZ camera 131 on the touched area and lifting of the helipad (that area indicated by a large letter H, identified by the reference 258 in FIG. 4c), especially if without night lighting systems or in case of temporary breakdowns.

Of course, nothing prevents the activation of the PTZ camera 131 and its laser illuminator from also taking place "automatically" (i.e. without the pilot's discretionary intervention), as soon as the approaching aircraft is intercepted, for example, by the aforementioned sensors 126 with radar technology and/or radar 136.

In this case, having identified the approaching aircraft, the PTZ camera 131 can rotate (by known means) to the optimal position to frame and illuminate the helipad.

Nothing prevents said PTZ camera 131, depending on the installation needs, can be installed either next to the HAPI/PAPI approach lighting systems or on piles where there is a flashing Beacon.

The laser illuminator can also favor a more correct display of said helipads both in the case of use, by said pilots, of NVG (Night Vision Goggles) viewers and in the case in which the aforementioned touching and lifting area is made with materials and reflective paints (see FIG. 4c).

As shown in the attached figures and already partially introduced, the module 102 of the multifunction apparatus 100 can further comprise:

the aforementioned satellite antenna 132, integrated in module 102, and without parts protruding from its cubical structure. Said satellite antenna 132 is preferably of the "flat" type and resistant to any environmental condition thanks to a special "Radome" (i.e. radar dome) which protects it from external events while ensuring the propagation of electromagnetic signals that are not attenuated through the body of the module 102. Furthermore, it does not require pointing to the satellite in order to be connected to the internet, ensures total geographical coverage and can therefore be implemented both in "stationary" and fixed multifunction apparatuses 100 (e.g. installed on terrestrial sites) and "mobile" because they are positioned on any vehicle and vehicle such as merchant vessels, tankers, offshore platforms, etc., an actuator 127 of the automations present in the monitored site, such as, for example, electrical installations and lighting, gates actuating systems, fire actuating systems, equipment for the reception and sending of technical alarm signals and a related automation module 128 input/output TCP/IP (controlled by a plurality of junction terminals 129) which, wired with internal and/or external devices of the multifunction apparatus 100 and suitably configured and programmed with a specific software suite, allows to generate and control any "AI" functions of Artificial Intelligence and/or of "building automation".

Below, some types of use of said automation module 128 and of the related managed devices will be illustrated without any limitative intent.

Their first field of use can be, for example, the "aeronautical" one, in particular for the activation of the lighting system of a runway or a helipad, for example. associated and present in an Oil & Gas site, during the approach of an aircraft or aircraft, (hereinafter, by way of example and without any limitative intent consisting in a helicopter).

The activation can provide two different modes, substantially similar to those already described previously with reference to the management of the PTZ camera 131 and the relative laser illuminator.

When a helicopter arrives in the landing phase, the first mode (see, in this regard, FIG. 3e and/or 3f and/or 3g) foresees to intervene on a normally open contact of a relay output of the module. 128 automation system which, connected to the Internet like the helicopter's avionics systems for the transmission of GPS data (see ref. 239 in FIG. 3e) and thanks to well-known centralized management software, will create a correlation for closing of said relay and the consequent activation of the helipad lights.

In other words, the multifunction apparatus 100, configured and programmed with the helicopter's geolocation system, will activate the lighting system of the helipad as soon as said helicopter enters a predefined detection area (as clearly shown with the ref. threshold 245 and entry into the detection area 246 of FIG. 3e).

Figure 6:
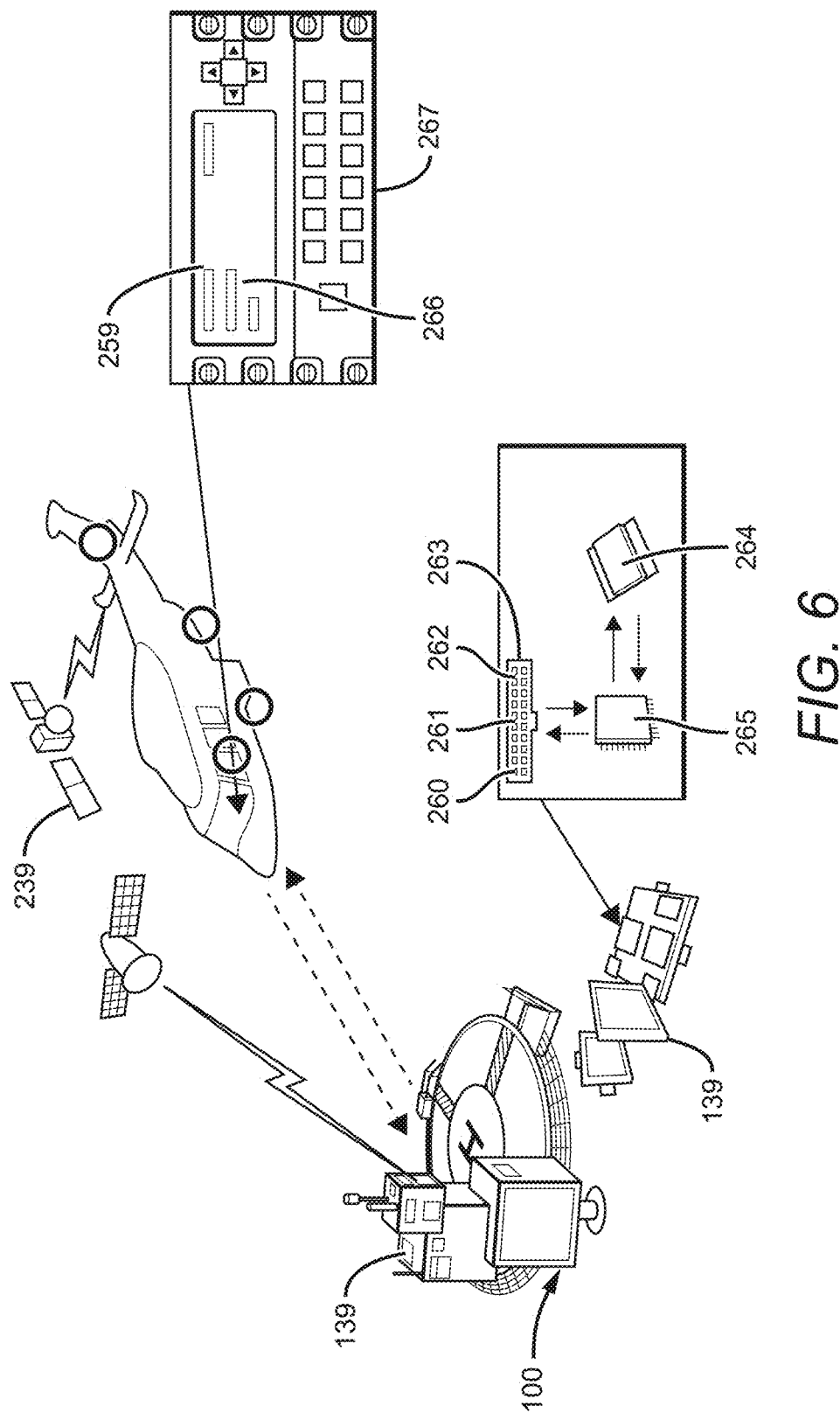
FIG. 6 schematically shows a further functionality of the multifunction control and management apparatus of "special plants and/or areas" of the invention for the activation of related automations, for example in the avionics/aeronautical field.

In non-automated cases, the multifunction apparatus 100 can receive the command to activate the runway or helipad lights directly from the aircraft via a special key located on the Display Panel (FIG. 6 ref. 259) of the related on-board instrumentation and via satellite communication (ref. 239 FIG. 6).

More precisely, installed in one of the modules 101, 102, 103 of the multifunction apparatus 100 of the invention (for example, in the module 102), an emergency AES device 139 (Auxiliary Emergency System; see FIG. 6 reference 139) arranged for the activation of these lights or any other automation.

The AES device connects via satellite to the said Aircraft Display Panel so as to receive, if necessary, "quick mail" (see reference 266 FIG. 6) pre-set and showing the automation commands.

In addition, the AES device (already suitably configured with the plurality of electrical and electronic components of the multifunction apparatus 100) can interact with said Display Panel 267 of the aircraft to notify "alerts" representative of any problems regarding the usability of the helipad and/or other automations, or difficult environmental conditions, for example detected by the multifunction apparatus 100.

By way of non-limiting example, the most significant alerts may be those of alarms for: gusts of wind exceeding the threshold supported by the aircraft, lack of electrical network, or general failure of the lighting system (symbolized in FIG. 6 by the references 260, 261, 262).

It should be noted that the aforementioned alert data received and displayed on the Display Panel can always be associated with GPS data of the multifunction apparatus 100 which generated it.

For all the purposes and purposes discussed above, the 139 AES device, enabled for satellite communication, can internally comprise one or more input and output modules (ref. 263 FIG. 6), an SBD system (ref. 264 FIG. 6) and relative CPU (ref. 265 FIG. 6) that allow the management of messages in sending (Mobile Originated MO-SDB) and receiving (Mobile Terminated MT-SBD).

It is therefore clear how this application is possible thanks to the scalability, the hardware/software configurability of the multifunction apparatus 100 and the interoperability with the geolocation systems of the aircraft currently in use and how it allows the implementation of the runway lighting system (or any other automation) from the aircraft via satellite (and no longer only from radio-control as up to now).

The second mode, shown schematically in FIG. 3f, on the other hand, provides for the combined action of the automation module 128 with the radar sensors 126 (possibly cooperating with the relative long-range radar 136 which amplify the signal) of the multifunction apparatus 100 and the relative motherboard 125.

As already in part described, when an aircraft arrives at a certain distance from the runway or helipad, known as the "recognition threshold" (ref. 248 in FIG. 3f) by the radar 136, used (for example less than 3000 m), the multifunction apparatus 100 will automatically trigger the primary control actuator 118 to switch on the runway or helipad lights (or any other automations that may be present).

The radar 136, on the basis of the acquired data, communicates them via TCP/IP to the management software which will activate and synchronize the PTZ camera 131 with the radar 136; as soon as it is synchronized with the radar, it will start tracking the aircraft (or any other flying objects) to support the pilot in the delicate landing phase.

This type of functionality can take place through the normal Internet connectivity of the aircraft and of the multifunction apparatus 100; moreover, in the event of a SAT/4G/5G fault or when there is a need for very low latency with high data throughput, it will also be possible through a direct connection in WIFI E6 between the multifunction apparatus 100, via the WIFI antenna 147 and the WIFI antenna on the aircraft.

These telematic connections will allow the pilot to view on his tablet 268, the video streaming of the PTZ camera 131, the graphic map of the site with the exact position of the TLOF area (Touchdown and Lift-off Area) and the position of the aircraft. detected by radar 136 (see FIG. 3f), this satisfies the following advantage: the pilot through a specific App, which divides the screen in two (see FIG. 3f) will be able to view the radar data (distance, position, speed, etc.) with visual feedback.

The alarm devices of the multifunction apparatus 100 of the invention, already mentioned previously, may possibly be programmed to emit acoustic or luminous warning signals in the event of anomalous or unidentifiable approaches, making the management of the monitored sites even more secure.

For problems relating to flight safety, said devices: radar 136, PTZ camera 131 and related telecommunication equipment of the multifunction apparatus 100 already mentioned, it is possible to send alerts both to pilots who will have to carry out the landing phase, and to unmanned aircraft. (see FIG. 3g). This use is more usable for Advanced Air Mobility and Urban Air Mobility which will see many more aircraft (eVTOL, UAS, etc.) on airspace.

In addition to the link and the functions described above, the multifunction apparatus 100 has a further radio communication link, which uses a cooperative technique based on ADS-B technology, comprising the antenna 140 and the management hardware 141.

Said link is ensured by an electronic digital recording device which is inside the multifunction apparatus 100 (ref. 269 FIG. 7) for the certification of aircraft landings (including drones), especially in remote areas and helipads, for example high risk or without ADS-B coverage or surveillance personnel, and a relatively small external antenna (not shown in the figure).

The 141 ADS-B device is preferably installed inside the 102 "safety, automation and digital recording".

Said electronic device 141 ADS-B, like other electrical and electronic devices of the multifunction apparatus 100, is connected:

to the local computerized network via the aforementioned switch 112, router 111, modem 115 and cellular and satellite antennas 123, 132, as well as to an external antenna (which can also be installed near the windsock and/or led beacon of the reference runway/helipad) with the ability to share information remotely.

Figure 7:
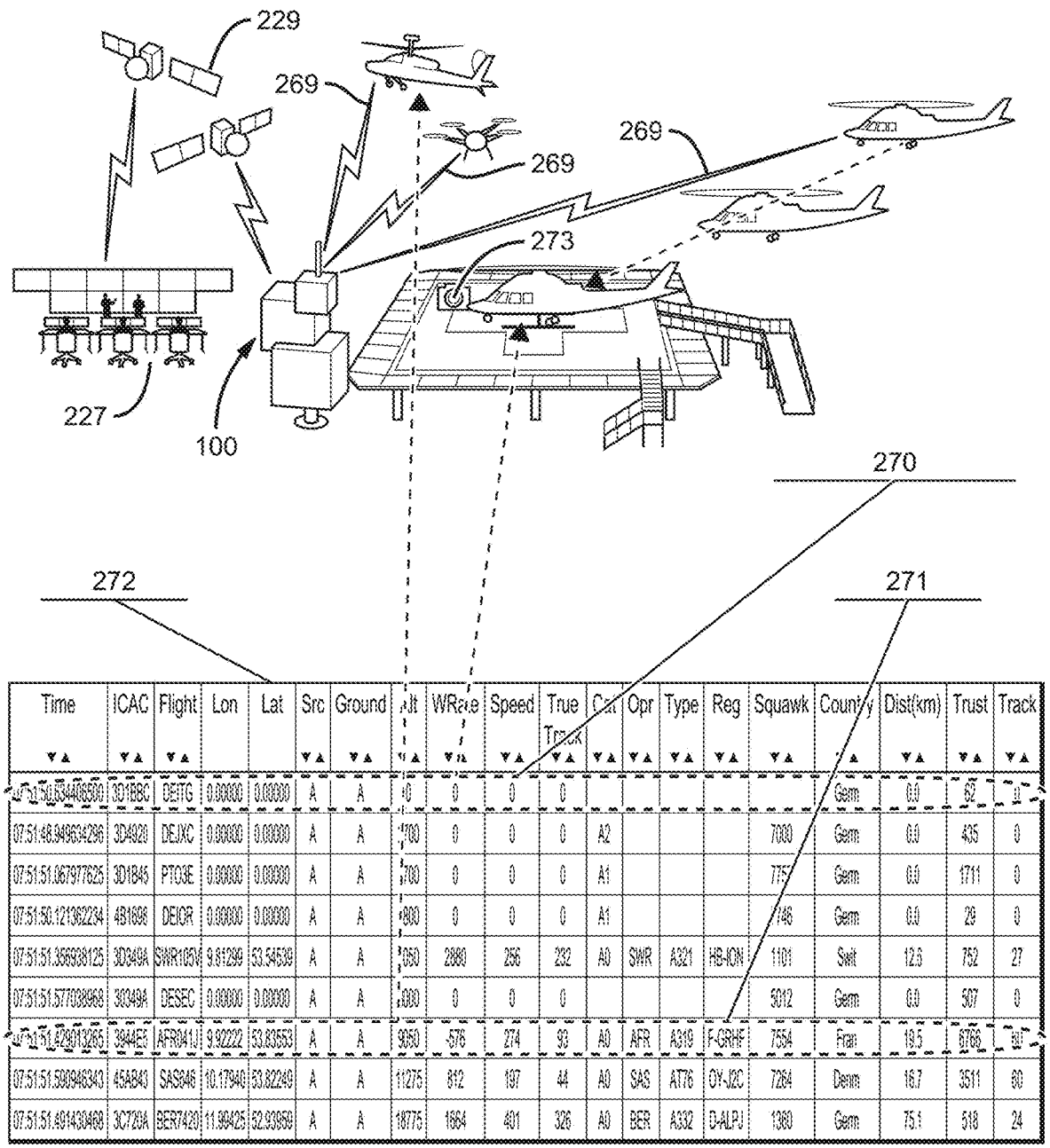
FIGS. 7, 7a represent an overview and example of the communication system of one multifunction apparatus in a unique Helipad as regarding to rotor wings aircrafts and the communication correlation in the network of interconnected multifunction apparatuses.

Said electronic device 141 ADS-B is used for various purposes, including:

"digital recording" (FIG. 7) of data, through radio links 269 ADS-B, reporting the landings by aircraft (or drones) concurrently to the Touchdown and Lift-off area—(TLOF; ref. 270, 271 of FIG. 7), especially in all those areas where human supervision is lacking (for example on all helipads for occasional use for helicopter rescue missions). Said data can also be supported by images (screenshot; FIG. 7 ref. 273) acquired by the camera 121,117 including, as seen, video analysis functions.

Figure 7A:
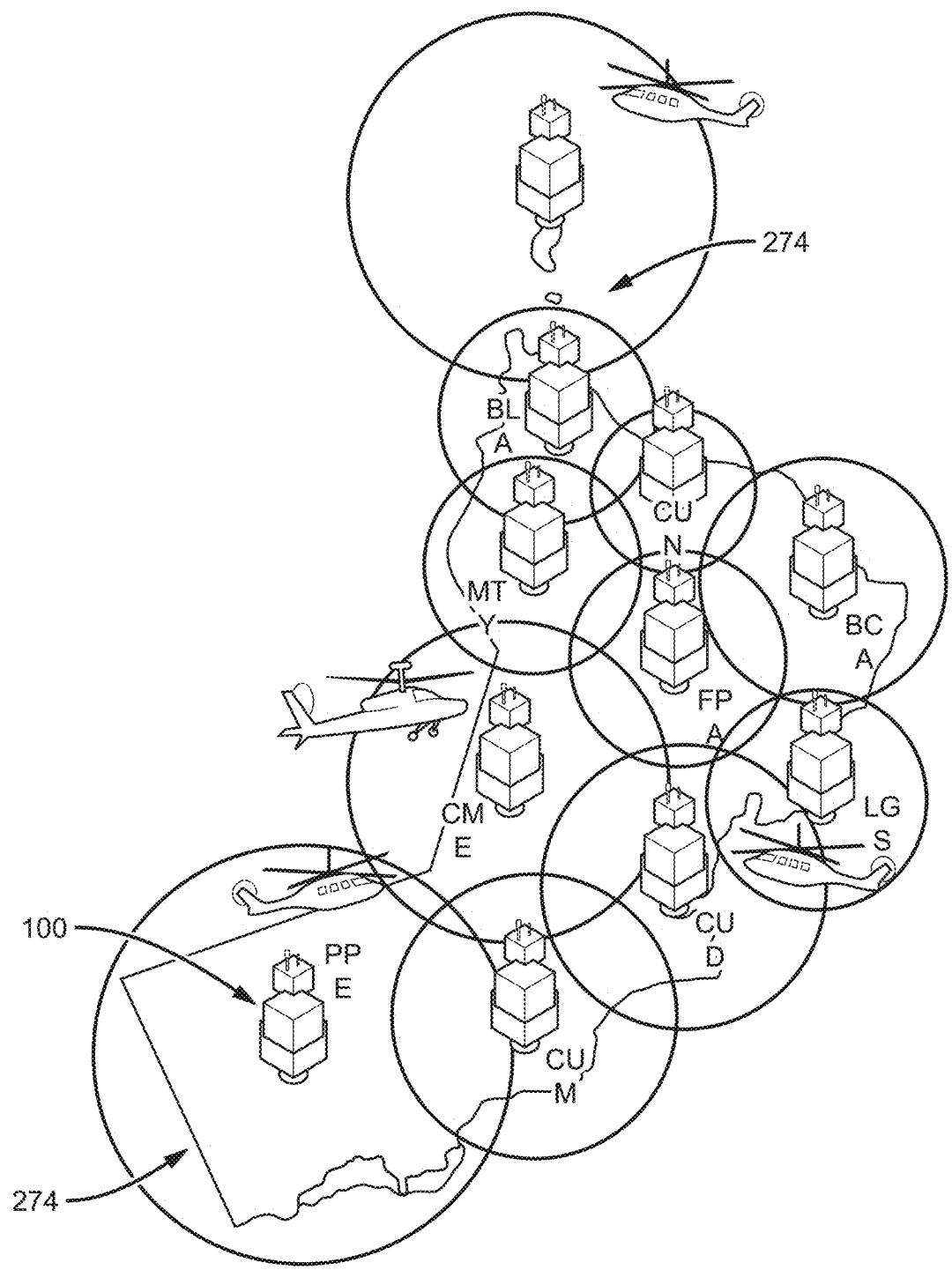

The most significant data that are usually digitally recorded and displayed in tables (see ref. 272 of FIG. 7) are at least: the ICAO univocal aircraft identification code and GPS data (geographical coordinates, speed, altitude, aircraft in flight or on the ground), remote connection for monitoring and tracking of aircraft and drones in risk areas where there is no radar coverage for airspace control and without the presence of man, creation and/or extension of a coverage map ADS-B for air traffic control (also known as ADS-B coverage) illustrated by way of example in FIG. 7a and usable for special areas without coverage; this coverage map can be created by installing in the area to be monitored several multifunction apparatuses 100 (ref. 274 in FIG. 7a), each of which with its own device 141 ADS-B and relative area coverage, being able to be interconnected by satellite; obviously all objects without transponders or which have been deliberately turned off, will be seen potentially as hostile.

The data transmitted by said multifunction apparatuses 100 can be encrypted using the Blockchain technology previously described in order to make at least the most sensitive data inaccessible, for example, those relating to air traffic for military needs, and connection via a specific App installed on the pilot's tablet/PDA (or, as seen, similar devices such as the cockpit Display Panel) between the aircraft and each of said multifunction apparatuses 100 and/or other reception devices connected and compatible with said ADS technology—B (for example for the detection of GPS points of operational vehicles in the monitored site and/or those of rescue in the vicinity of accidents, floods or any emergency scenario).

Another field of use of the multifunction apparatus 100 of the invention through one or more of its electrical and electronic components that it implements is the management of drones (ref. 231 FIG. 3c) for transmission to a control unit (see, for example, ref. 227 in FIG. 3c which shows an alert and data management operations center), of the images collected during patrol services (e.g. BVLOS type), aimed at ensuring maximum site security monitored, especially if at high risk and/or located in remote and inaccessible areas or not directly manned by personnel (see FIG. 3c).

According to a possible aspect of the invention, said drones are:

"parked" in special stations (ref. 232 in FIG. 3c) in proximity, (connected via ethernet 234) to a multifunction apparatus 100 which represent protection areas and recharging (of the battery) of the drone as well as data transmission points and images captured by them at specific "waypoints" (ref. 238 in FIG. 3c) preconfigured for patrol service, said waypoints being, as is known, real and/or virtually generated points (i.e. without any specific relationship with distinctive features of the real world) identified by at least two geographical coordinates (latitude and longitude) and used to define the navigation routes of the drone, activated by the combined action of the automation module 128 input/output, of the motherboard 125 and of the radar sensors 126 previously described, while the eventual radar 136 of the multifunction apparatus 100 allows to detect intrusions by drones or aircraft, reducing the risk of collisions or incorrect image acquisition.

It is useful to specify how these drone stations are designed to work 24/7, even in extreme environmental and atmospheric conditions, and are connected to each corresponding multifunction apparatus 100 preferably via ethernet technology.

These drones, following programmed waypoints, acquire images of the monitored site in flight and, once parked in the relative stations, transmit them to the aforementioned control unit through the functionalities of the multifunction apparatus 100 which is always online, e.g. via satellite (ref. 229 FIG. 3c).

A further potential use of the automation module 128 is that for "maintenance" purposes of one or more equipment of the infrastructures and/or automation of the monitored site, being able to collect and forward all the anomalies detected and to sort them to the operational or specific centers device (smartphone/PDA) supplied to authorized personnel.

Finally, the components and internal devices of the "electrical power supply and connections" module 103 are described.

Said module 103 comprises a plurality of electrical management devices consisting of at least:

an electrical panel 133 with "smart" motorized controls, said controls allowing, in the event of short circuits or dispersions, not only monitoring, through synoptic via web, of the entire panel 133 but also the remote reset of the individual switches, power supplies, junction terminals and wiring both of the modules 101,102,103 and of the plant belonging to the site controlled by the multifunction apparatus 100, two uninterruptible power supplies "UPS" 142, 143 preferably equipped with backup batteries. The UPS 142 will energetically support the multifunction apparatus 100. The UPS 143 will energetically support the lighting system of the helipad, and a control unit 146 for the management of electrical loads, said control unit 146 allowing to connect the multifunction apparatus 100 to alternative energy sources such as, for example and without any limitative intent, electrical power supply systems with photovoltaic panels, diesel power generators, hydrogen or similar electric power supplies.

It appears evident how the combination of the aforesaid electrical devices and the possible integration with photovoltaic panels ensure energy self-sufficiency for the multifunction apparatus 100 of the invention; said apparatus 100 can therefore be installed anywhere and can be used in any environmental and operational situation.

It is clear that further variants of the invention described above are possible, always falling within the novelty areas inherent in the inventive idea, just as it is clear that in the practical implementation of the invention the various components described above can be replaced by technically equivalent elements.

More precisely, nothing prevents the Blockchain technology and the related hardware, described above, from being used not only for the processing of data and parameters detected by the sensors associated with the various infrastructures, machines and/or automations of the monitored site (eg. various Oil & Gas extraction wells) but also for all the information that can be acquired from the various devices implemented in the multifunction apparatus 100, e.g. from the aforementioned airspace control devices, video surveillance, authentication and recognition of personnel, anti-intrusion and sabotage, control of access to the site, from drones or similar, as well as, as partly already anticipated, for the management of information and data associated with any means that operate or interact with the monitored site.

For example, the use of the Blockchain technology implemented, as seen, in the multifunction apparatus 100 of the invention, can be fundamental in the field of aviation, in particular for the management aircraft that use take-off and landing runways and helipads. Some aspects and reasons for use are therefore described below.

Each flight, e.g. commercial, is characterized and identified by information and data such as, without any limitative intent, flight start and end times, point and place of departure, route and final destination, flight altitude, radio communications, speed, start/stop period of engines, actual flight time or similar weather information, etc.

This information and data can be used for various purposes. such as technical, commercial and billing purposes, for professional and, sometimes, legal purposes, summarized below by way of example:

a) Technical Purposes:

The data referring, for example, to the starting/stopping of engines, take-off/landing or "cycles", flight time and any information relating to time, are recorded, as known, in special a/c registers (Aircraft Technical Logbook/QTB) and used to calculate:

1. Maintenance programs
2. Withdrawal of components
3. Component review
4. Maintenance of the airframe of the aircraft and its engines The validation and certification, through Blockchain technology, of said data and information on flight times/cycles is of enormous importance both in terms of airworthiness of an aircraft and in terms of safety.

b) Commercial and Billing Purposes:

In this case, said validation and certification, for example, of flight times and any other data avoid fraud, errors and reduce disputes on invoices from/to suppliers, customers, Institutions, Bodies etc.

For example, the billing service relating to services provided by ATC (Air Traffic Control) entities, such as Eurocontrol, ENAV, FAA etc., can be automatically validated, the calculation/billing process can be automated (by way of example, specific reference to route, assistance and terminal fees) and even the airports themselves will be able to use certified data to invoice services to customers.

The actual value of each a/c can also be verified and validated (in terms of real use) and each existing contract, e.g. that of maintenance, will benefit from the real state of an aircraft avoiding any attempt at fraud.

Finally, the so-called "Maintenance reserve" of any leasing contracts may be certified.

c) Professional Purposes:

For example, the pilot of an aircraft keeps a personal EFB logbook (electronic flight bag) in which he records flight hours, routes, the aircraft on which he flew, etc.

This is necessary both to record personal experience (and skills) and to plan periodic training as per laws and regulations.

In addition, any CAA (Civil Aviation Authority) that endorses the system data validation, automatically certifies the actual flight experience of any pilot.

It is obvious that an automatic and validated fraud-proof system such as the one adopted through the Blockchain technology described above will be fully appreciated by authorities, operators, pilots themselves, as well as training centers and insurance companies.

d) Legal Purposes:

Any legal action, complaint, dispute that may refer to the use of an a/c or part of it, can have a reliable, incontrovertible system to rely on to certify flight data, times and so on.

Insurance companies will thus be able to benefit from the aforementioned data validation to reduce fraud attempts and (possibly) reduce the costs of insurance policies.

Other possible variants of the invention can provide that one or more of the various components and devices housed in one of the modules 101,102,103 can be moved to other modules already integrated by the multifunction apparatus A of the invention or inserted in further modules which can be implemented thereto.

Figure 1B:
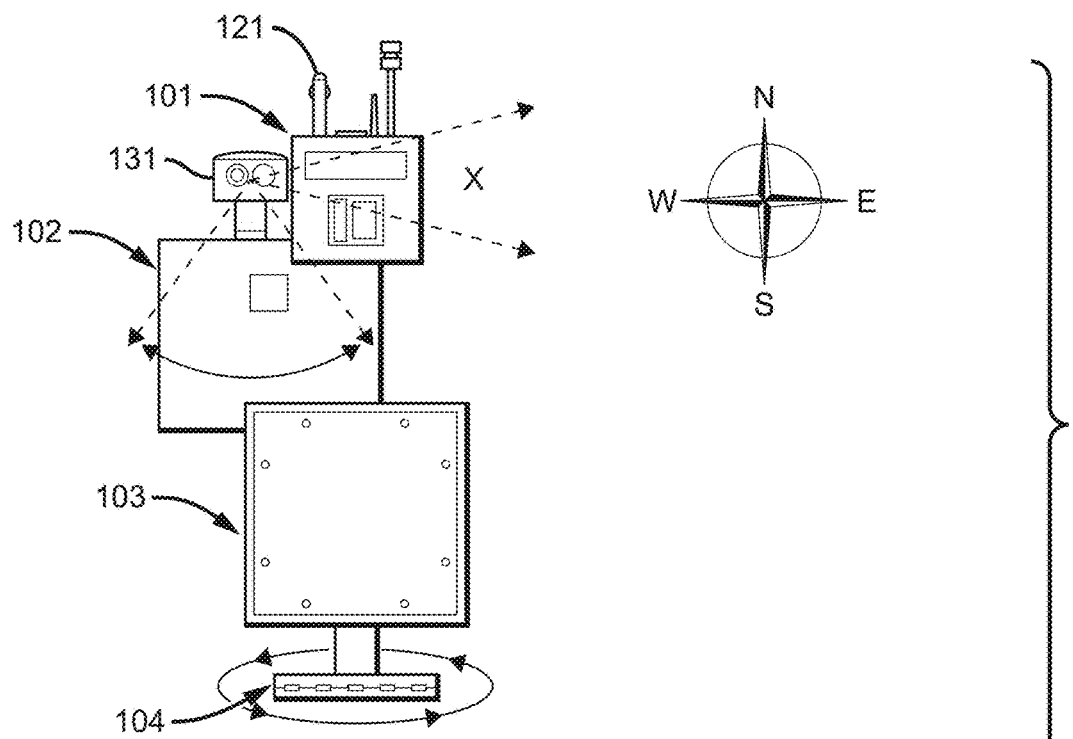
Figure 1C:
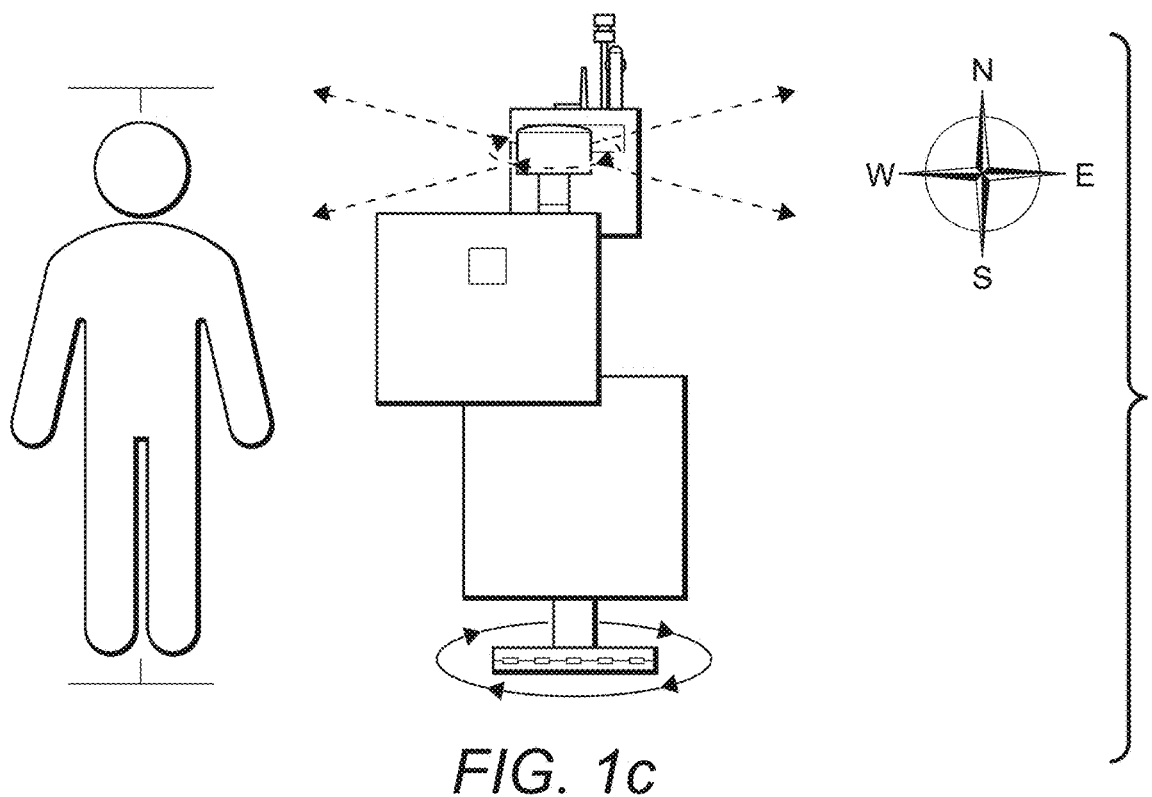

Furthermore, the support base 104 of the multifunction apparatus 100 can integrate a servomechanism (of known technology) which allows a rotation of up to 90° of the multifunction apparatus 100 itself (FIG. 1*b*, 1*c*).

This rotation allows to optimize the operation of some components and devices installed in the modules 101,102, 103 of the multifunction apparatus 100, in particular:

of the aforementioned camera 121 installed, as seen, externally and on the top of the module 101 and used for the visual monitoring of everything what surrounds the multifunction apparatus 100 thanks to its vision functionality, mainly daytime and short-range, and image recording at 720°, and/or of the aforementioned hybrid PTZ camera 131, generally equipped with a laser illuminator to be mainly used for viewing in low or no light conditions.

When installed, as preferred, on the upper external part of the module 102 (FIG. 1*b*), the vision of the PTZ camera 131 could be obscured and limited by the size of the nearby module 101 of the multifunction apparatus 100 while its installation on the module 101, in order to obviate this drawback, it would be jeopardized both by its dimensions and because it would occlude an important portion of the viewing area of the other camera 121.

Therefore, the only way to overcome these constructive and functional problems is to apply said servomechanism to the support base 104 of the multifunction apparatus 100 which will therefore be designed for optimal vision both at short range and at night or in poor visibility (see FIG. 1*c*), i.e. without the presence of blind spots.

Said rotation of the multifunction apparatus 100, from a default position (0° degrees; see FIG. 1*b*) to an operating position (for example, 90° degrees as shown in FIG. 1*c*), is allowed by the I/O board (not shown) of the PTZ camera 131 suitably interfaced with the actuator of the servomechanism of the support base 104.

Thanks to this additional function, the users connected remotely (via smartphone, control room, etc.) to the multifunction apparatus 100, and consequently to the relative PTZ camera 131, they can voluntarily apply, by activating the relay output of the same, the desired rotation to have the best vision and to perform any optical zoom at 3600.

Finally, although the multifunction apparatus 100 of the invention lends itself very well to the management and monitoring of Oil & Gas plants and areas and its possible "infrastructures" (offshore platforms, merchant runways and helipads etc.), nothing prohibits, as already mentioned, use in other sectors and areas or for different purposes.

An example is shown in FIG. 3*d* referring to the use of the multifunction apparatuses 100 of the invention near a hospital structure (see ref. 210), in the event of a health and/or environmental emergency.

By means of one or more multifunction apparatuses 100, said hospital structure and its internal or external staff (e.g. emergency services) will be able to:

use an internet connection (ref. 240), including satellite (ref. 229), communicate via Wi-Fi with aircraft and/or other multifunction apparatuses 100 located in the emergency area and/or with operational and control centers, also via satellite communicate by telephone (voice) with the same aircraft and/o with other multifunction apparatuses 100 located in the emergency area and/or with said operating centers, acquire and transmit audio-video data to said operating and control centers 227, 215, 216 (e.g. emergency services or Civil Protection), access the resources of the multifunction apparatuses 100 for the detection of weather and environmental parameters and data via applications loaded on smartphones, PDAs, tablets or similar devices or via portable satellite terminals (ref. 242), d video surveillance or for the management of automations (gates, alarms and the like), via radar 126, 136 of the multifunction apparatuses 100, activate the lighting systems of runways and helipads, or similar landing/take-off areas, (e.g. for rescue aircraft) or any other automation, and through at least the aforementioned PTZ camera 131, support the pilot of any rescue aircraft in the approach (tracking) and landing phases on said runways, helipads or temporary landing areas.

Finally, there is nothing to prevent the installation of said multifunction apparatuses 100 of the invention in aqueducts and water plants (or similar structures for the distribution of natural resources) both for their monitoring and, in particular, for the storage via Blockchain, of further data and more parameters. or less sensitive and critical inherent to their management and the characteristics, quality and quantity of the water supplied.

The invention claimed is:

1. Multifunction apparatus including electrical and electronic devices for the control and management, in real time, of complex plants and/or special areas in which said multifunction apparatus is installed
   characterized by the fact that the multifunction apparatus includes a plurality of modules, preferably three modules, assembled together to form a body of said multifunction apparatus, each of said modules including and integrating one or more of said electrical and electronic devices connected to each other; said multifunction apparatus includes at least: a monitoring and telecommunications module, a security, automation and digital recording module, including electrical and electronic devices for the management via Blockchain of data and parameters of said complex plants and/or special areas and/or vehicles operating or interacting in them, a power supply and connections module.

2. Multifunction apparatus according to claim 1 characterized by the fact that said modules integrate a Plug & Play technology both for their mutual assembly and for the connections among internal wirings through connectors and special connections; said modules not requiring special calibrations to work.

3. Multifunction apparatus according to claim 1 characterized by the fact that:
   the monitoring and telecommunications module includes devices for detection of meteorological data, identification of operating personnel of said complex plants and/or special areas, monitoring of activities and operation carried out near said multifunction apparatus preventing acts of vandalism or sabotage and the provision of tele-communications;
   the security, automation and digital recording module is suitable for creating physical security, acquiring and storing through Blockchain sensitive data and parameters of said complex plants and/or special areas, the remote management of machines and plants and ensure the integrity of the said electrical and electronic devices;
   the power supply and connections module include devices for power supplying all modules; said modules being supported by a base anchored to the ground.

4. Multifunction apparatus according to claim 3 characterized by the fact that said monitoring and telecommunications module includes within it a modem and a router cooperating with a satellite antenna and a 4G/5G antenna for Internet connection; in addition, said monitoring and telecommunications module includes VoIP devices, video surveillance, control of accesses, environmental data, Wi-Fi hotspots, ethernet switches and various actuators for remote management.

5. Multifunction apparatus according to claim 4 characterized by the fact that the VoIP devices cooperate with a security label applied preferably on a first module of said multifunction apparatus and that includes instructions for use in different languages; said multifunctional apparatus including a video surveillance camera with globular vision and recording at 720° without moving parts.

6. Multifunction apparatus according to claim 5 characterized by the fact that the video surveillance camera includes video analysis functionality, software integration for face recognition and is supported by four cameras with thermographic vision.

7. Multifunction apparatus according to claim 1 characterized by the fact that said security, automation and digital recording module includes digital computing and recording devices for the management via Blockchain of data and parameters of said complex plants and/or special areas, said digital computing and recording devices including ASICs and/or CPUs and/or GPUs and/or FPGAs, DSP, APUs connected to the computerized network of said multifunction apparatus and to the Internet; said digital computing and recording devices being able to connect to other digital computing and recording devices of further multifunction apparatuses, so as to create a distributed peer to peer DLT network with verification of the identity of the participants.

8. Multifunction apparatus according to claim 7 characterized by the fact that one of said ASICs and/or CPUs and/or GPUs and/or FPGAs, DSP, APU is responsible for building and adding a new block in said Blockchain while the other ASICs and/or CPUs and/or GPUs and/or FPGAs, DSP, APUs verify that the hashing value of the block is valid.

9. Multifunction apparatus according to claim 8 characterized by the fact that said Blockchain is a Network of Distributed Ledgers (DLT) at 2 levels comprising two different types of Blockchain, with different degrees of authorization, said two levels allowing storage in a secure and certain way and protection, for technical, business, commercial, billing, professional or legal purposes, of the information, data and parameters acquired and made available depending on different degrees of authorization required, their validation and certification avoiding fraud tampering, disputes and errors.

10. Multifunction apparatus according to claim 9 characterized by the fact that said 2-level DLT distributed network includes:
    a first deeper level that receives all parameters and data of said complex plants and/or special areas monitored and/or these means operating in them, said first deeper level providing a closed Blockchain, which requires authorization and access authentication, a second more superficial level that provides for a public Blockchain, smart contracts algorithms identifying and distinguishing between said parameters and data of the first level sensitive data from non-critical ones, the latter being attached to writing public transactions on blocks of the public Blockchain of said second level.

11. Multifunction apparatus according to claim 1, characterized by the fact that said security, automation and digital recording module further includes: a motherboard, a plurality of perimeter sensors with radar technology, I/O devices and housing for hybrid PTZ camera equipped with dual optics for normal and thermographic vision, and laser illuminator; said PTZ camera being also positionable near the multifunction apparatus and connected via a Local Area Network.

12. Multifunction apparatus according to claim 11 characterized by the fact that said perimeter sensors with radar technology are connected to the computerized local network of said multifunction apparatus and said perimeter sensors being of the type capable of sending to said PTZ camera tracking commands of detected objects and/or activation of systems.

13. Multifunction apparatus according to claim 12 characterized by the fact that the security, automation and digital recording module further includes said satellite antenna, said antenna being flat, without parts protruding from the structure of the module and equipped with a special radome, said antenna not requiring pointing to the satellite in order to be connected to the Internet.

14. Multifunction apparatus according to claim 12 characterized by the fact that said monitoring and telecommunications module includes within it a modem and a router cooperating with a satellite antenna and a 4G/5G antenna for Internet connection; in addition, said monitoring and telecommunications module includes VoIP devices, video surveillance, control of accesses, environmental data, Wi-Fi hotspots, ethernet switches and various actuators for remote management, and by the fact that said security, automation and digital recording module further includes a digital recording device of ADS-B data acquired for certification of aircraft landings with the relative address of the aircraft with ICAO code on remote areas and helipads and/or for creation of ADS-B coverage also for aircraft flying at low altitude; wherein said ADS-B data can be encrypted via Blockchain.

15. Multifunction apparatus according to claim 1 characterized by the fact that said power supply and connections module includes: an electrical panel with motorized controls, two uninterruptible power supplies, power supplies, junction terminals, wiring of said modules and a central management of electrical loads.

16. Multifunction apparatus according to claim 15 characterized by the fact that each of the modules is internally pressurized and hermetically isolated from external environment, an internal overpressure to the modules preventing entry from the outside of vapors, gases, moisture or any other substance harmful to said electrical and electronic devices and their connectors and wirings.

17. Multifunction apparatus according to claim 1, characterized by the fact that the monitoring and telecommunications module further contains an AES satellite communication emergency device that directly connects to a Display Panel of on-board instrumentation of aircrafts.

18. Multifunction apparatus according to any claim 17 characterized by the fact of including a radar for the detection of any object and/or long-range obstacles.

19. Multifunction apparatus according to claim 1, characterized by the fact that a WIFI E6 backup protected audio/video/data connection is available with aircrafts thanks to a dedicated antenna and connected to a Local Area Network of the multifunction apparatus.

20. Multifunction apparatus according to claim 1, characterized by the fact of being installable in an Oil & Gas plant and/or in the avionics/aeronautical field.

\* \* \* \* \*